United States Patent [19]

Bahl et al.

[11] Patent Number: 4,980,918
[45] Date of Patent: Dec. 25, 1990

[54] SPEECH RECOGNITION SYSTEM WITH EFFICIENT STORAGE AND RAPID ASSEMBLY OF PHONOLOGICAL GRAPHS

[75] Inventors: Lalit R. Bahl, Amawalk; Paul S. Cohen; Robert L. Mercer, both of Yorktown Heights, all of N.Y.

[73] Assignee: International Business Machines Corporation, Armonk, N.Y.

[21] Appl. No.: 732,472

[22] Filed: May 9, 1985

[51] Int. Cl.$^5$ .............................................. G10L 7/08
[52] U.S. Cl. .................................................... 381/43
[58] Field of Search ................................. 381/41–45; 364/513.5, 200, 900

[56] References Cited

U.S. PATENT DOCUMENTS

| | | | |
|---|---|---|---|
| 3,679,830 | 7/1972 | Uffelman et al. | 381/41 |
| 4,032,710 | 6/1977 | Martin et al. | 381/41 |
| 4,059,725 | 11/1977 | Sakoe | 364/513.5 |
| 4,092,493 | 5/1978 | Rabiner et al. | 381/43 |
| 4,107,460 | 8/1978 | Grunza et al. | 381/43 |
| 4,181,821 | 1/1980 | Pirz et al. | 381/43 |
| 4,400,788 | 8/1983 | Myers et al. | 381/43 |
| 4,481,593 | 11/1984 | Bahler | 381/42 |
| 4,513,435 | 4/1985 | Sakoe et al. | 381/41 |
| 4,587,670 | 5/1986 | Levinson et al. | 381/43 |
| 4,723,290 | 2/1988 | Watanabe et al. | 381/43 |
| 4,741,036 | 4/1988 | Bahl et al. | 381/43 |

OTHER PUBLICATIONS

Jelinek, "Continuous Speech Recognition by Statistical Methods", Proceedings of the IEEE, vol. 64, No. 4, Apr. 1976, pp. 532–556.
Levinson, "Some Experiments with a Linguistic Processor for Continuous Speech Recognition", IEEE Trans. ASSP, vol. ASSP-31, No. 6, Dec. 1983, pp. 1549–1555.
P. S. Cohen and R. L. Mercer, "The Phonological Component of an Automatic Speech-Recognition System", Speech Recognition Academic Press, Inc. 1975, New York, San Francisco, London, pp. 275–320.
P. S. Cohen and R. L. Mercer, "Method for Rapidly Applying Context-Sensitive Phonological Rules", IBM Technical Disclosure Bulletin, vol. 24, No. 8, Jan. 1982, pp. 4084–4086.
L. R. Bahl, F. Jelinek, R. L. Mercer—"A Maximum Likelihood Approach to Continuous Speech Recognition"—3/83, IEEE Trans on Pattern Analysis, vol. PAM1-5, No. 2, pp. 179–190.
L. R. Bahl, F. Jelinek, R. L. Mercer—"Faster Acoustic Match Computation", 9/80, IBM Tech. Discl. Bulletin, vol. 23, No. 4, pp. 1718–1719.

Primary Examiner—Dale M. Shaw
Assistant Examiner—John A. Merecki
Attorney, Agent, or Firm—Marc A. Block; Marc D. Schechter

[57] ABSTRACT

A continuous speech recognition system having a speech processor and a word recognition computer subsystem, characterized by an element for developing a graph for confluent links between confluent nodes; an element for developing a graph of boundary links between adjacent words; an element for storing an inventory of confluent links and boundary links as a coding inventory; an element for converting an unknown utterance into an encoded sequence of confluent links and boundary links corresponding to recognition sequences stored in the word recognition subsystem recognition vocabulary for speech recognition. The invention also includes a method for achieving continouous speech recognition by characterizing speech as a sequence of confluent links which are matched with candidate words. The invention also applies to isolated word speech recognition as with continuous speech recognition, except that in such case there are no boundary links.

23 Claims, 25 Drawing Sheets

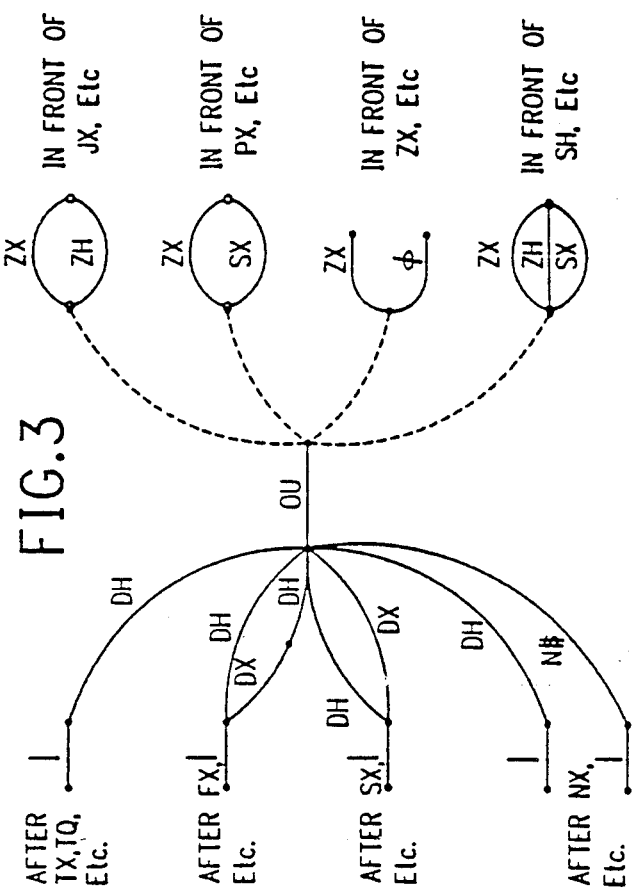

FIG. 5.1
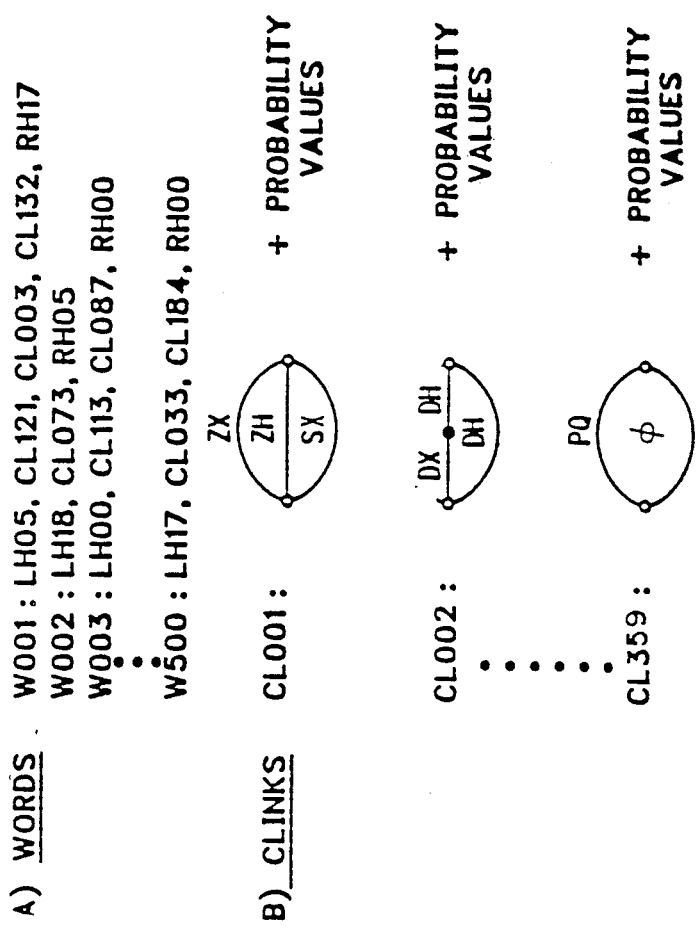

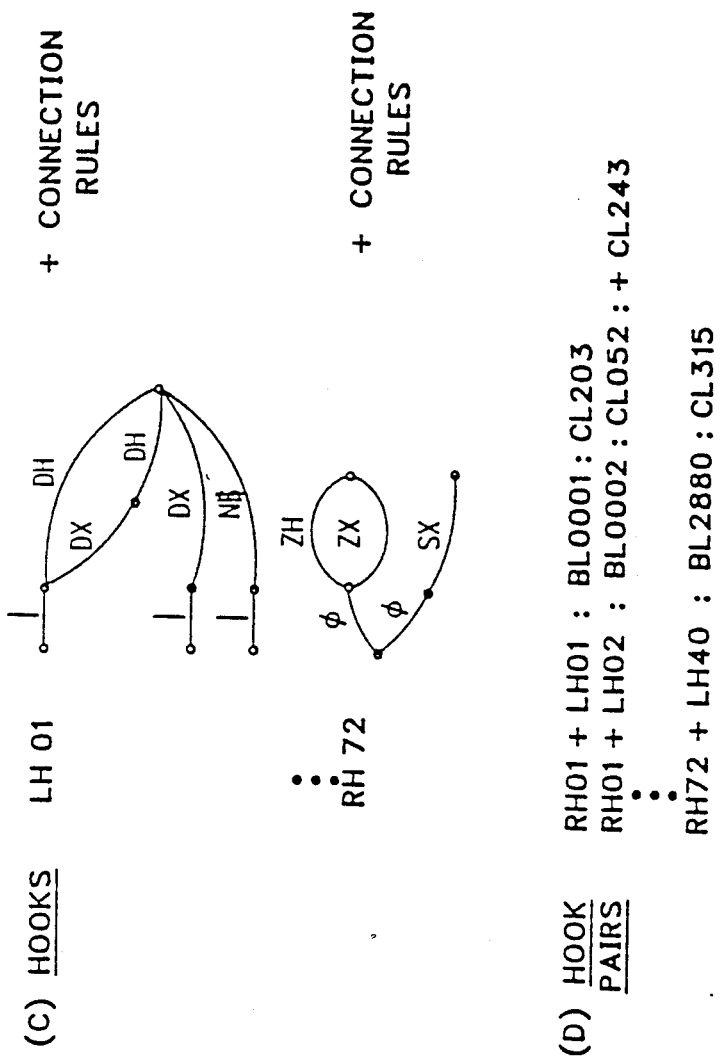
FIG. 5.2

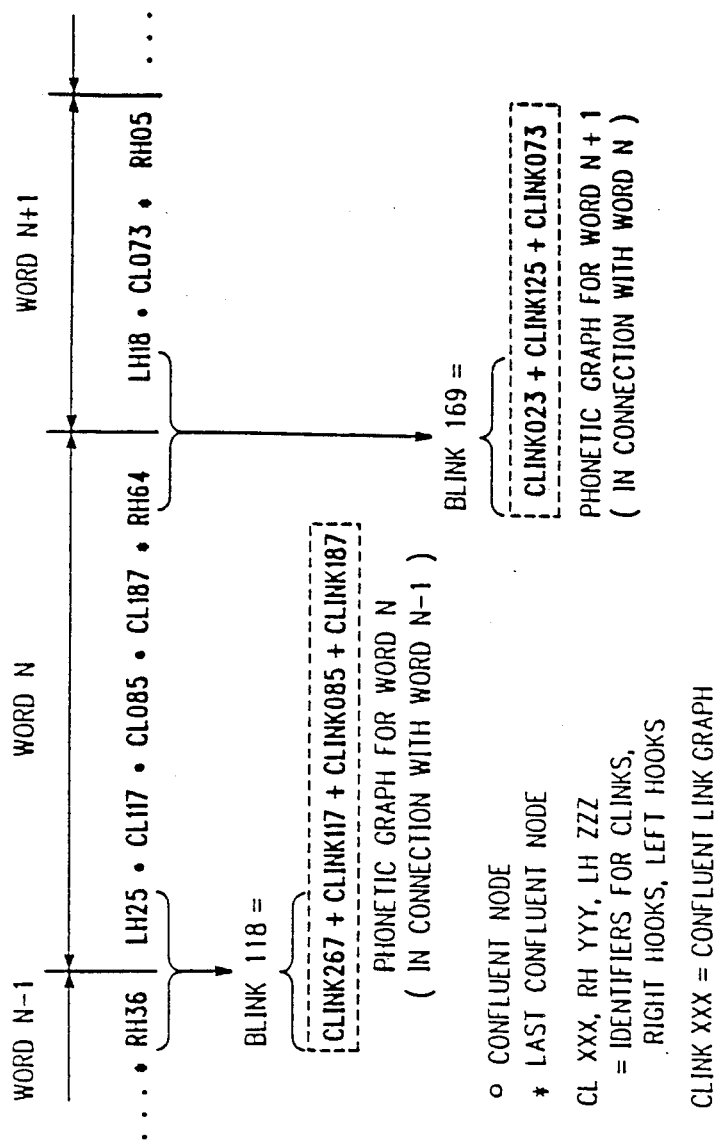

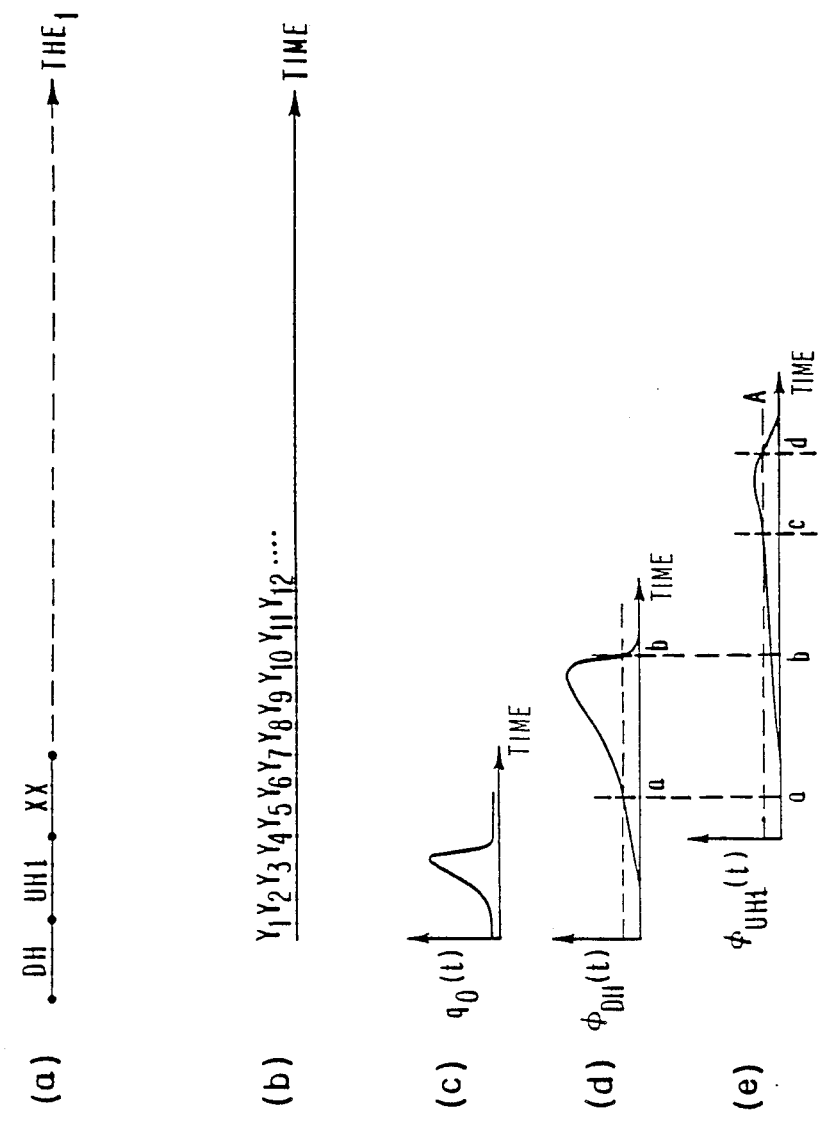

SPEECH RECOGNITION SYSTEM WITH EFFICIENT STORAGE AND RAPID ASSEMBLY OF PHONOLOGICAL GRAPHS

FIELD OF INVENTION

The present invention is related to speech recognition, and preferably to systems for recognition of continuous speech using phonetic graphs as word models.

DESCRIPTION OF PRIOR AND CONTEMPORANEOUS ART

For systems which use only small vocabularies of a few hundred words and which are designed only for recognizing unconnected words spoken separately, storage requirements are low and access speed is of no importance.

In more powerful speech recognition systems, vocabularies of many thousands of words are used. Further, to enable recognition of connected words in continuous speech, prior models or phonetic graphs of words must be expanded to accommodate the many possible variations in pronunciation of the initial portion and the ending portion of the word, which are due to the different contexts in which a word may occur.

Techniques for handling these problems are described in an article by P. S. Cohen and R. L. Mercer, "The Phonological Component of an Automatic Speech Recognition System", published in *Speech Recognition*, edited by D. R. Reddy, Academic Press, N.Y. 1975, pp. 275–320, and in an article by the same authors entitled "Method for Rapidly Applying Context-Sensitive Phonological Rules", published in the IBM Technical Disclosure Bulletin, Vol. 24, No. 8, January 1982, pp. 4084–4086.

Because of increased vocabularies and the expansion of word graphs, and the necessity to store connection rules for the expanded graphs, storage requirements and thus also access times increase substantially. It is desirable to efficiently use the amount of storage space available and to simplify access to models during recognition.

OBJECTS OF THE INVENTION

A primary object of the present invention is to store word models or phonetic graphs in a continuous or isolated word speech recognition system, by which a reduction in required storage space is achieved. Word models are divided into elementary graphs each of which corresponds to a "CLINK", wherein a CLINK represents one or more pronunciations of a sound or sequence of sounds extending between two confluent nodes. For continuous speech, internal portions of each word and portions where two words have a boundary are comprised of CLINKS which are represented by elementary graphs. With isolated word speech, there may be no boundary portions as in continuous speech but the broad teachings of the invention apply.

It is yet another object of the invention to provide storage for phonetic models that allows rapid assembly of word graphs during a recognition process.

DISCLOSURE OF THE INVENTION

According to a continuous speech embodiment of the invention, initially prepared phonetic word graphs are divided into subgraphs between confluent nodes, called confluent links or CLINKS, and left and right boundary portions called HOOKS. In a preliminary operation, all possible connections of right and left HOOK pairs are made to generate subgraphs for boundary links called BLINKS, each of which represents the connecting link of two words. Confluent links (CLINKS) and boundary links (BLINKS) may occur several times in different words or word links, but each is stored preferably only once in a separate inventory. Each HOOK and CLINK is represented by a corresponding identifier. Hence, for each word a complete model or graph is not stored but instead only a string of numbers or identifiers, which identifies the HOOKS and CLINKS of which the respective word graph is comprised is stored.

If a word model is to be used during recognition, the identifier string is fetched, and the distributed elements of the word graph can be rapidly accessed. The necessary boundary link, which not only depends on the currently investigated word but also on the previous words, is accessed by using the right HOOK identification of this last word and the left HOOK identification of the current word.

The advantages gained are obvious. Instead of storing all word graphs in detail, the elementary graphs—which reoccur in many word graphs—are stored once. The boundary graphs which depend on context are preassembled and can be rapidly accessed, thus avoiding evaluation of HOOK connections during recognition. If a new word is to be added to the vocabulary, it is sufficient in most cases to store only the string of numbers identifying the subgraphs of the word, because with high probability the graphs for the CLINKS of the word and for the BLINKS based on the HOOKS of the word are already stored. Only in rare cases is the addition of a new CLINK or BLINK necessary.

For isolated word speech, words may be characterized by a string of numbers or identifiers which correspond to CLINKS extending from the defined beginning to the defined end of the word. As with continuous speech, elementary graphs are stored once and each word is represented by a string of identifiers—each corresponding to an elementary graph for a CLINK. Storage requirements are again greatly reduced.

These and other advantages will become apparent from the following detailed description of an embodiment of the invention which is illustrated by accompanying drawings.

BRIEF DESCRIPTION OF THE DRAWINGS

FIG. 2(A) is a phonological graph for the word "brand"; FIG. 2(B) is a graph for "new"; and FIG. 2(C) shows the graphs of the two words connected.

FIG. 3 shows a phonetic graph for a word, with open branches which collectively form respective HOOKS at the left and right end representing the various pronunciations in different contexts.

FIG. 5 (having parts 5.1 and 5.2) is a schematic representation of the different inventories of elementary graphs and identifier strings that are stored for a speech recognition vocabulary in a system applying the invention.

FIG. 5.1(A) lists words as identified strings; FIG. 5.1(B) and FIG. 5.2(C) show elementary graphs which represent strings; and FIG. 5.2(D) shows "hooks" that pair with each other.

FIG. 6 illustrates the assembly of word graphs for the recognition procedure, using elementary graphs or CLINKS stored separately.

FIG. 23 (a through e) are diagrams which show the interrelationship between phones, a label string, and start and end times determined in the matching procedure.

DESCRIPTION OF PRIOR AND CONTEMPORANEOUS ART

Phonetic Model for Words

For representing words of a given vocabulary in speech recognition systems, several techniques have been employed. One way to represent words is to use a string of phonemes each of which is the model for a basic sound roughly corresponding, for example, to a vowel or consonant represented by the letters of the alphabet. As there are very many different possible pronunciations of a word, there would have to be either as many models as there are pronunciations, or one model should accommodate all of them. An intermediate possibility is to provide one or a few baseform representations of each word, and to give, in addition, a number of rules for possible variations. The above-mentioned articles by Cohen and Mercer provide a good description of this technique.

Figure 1:
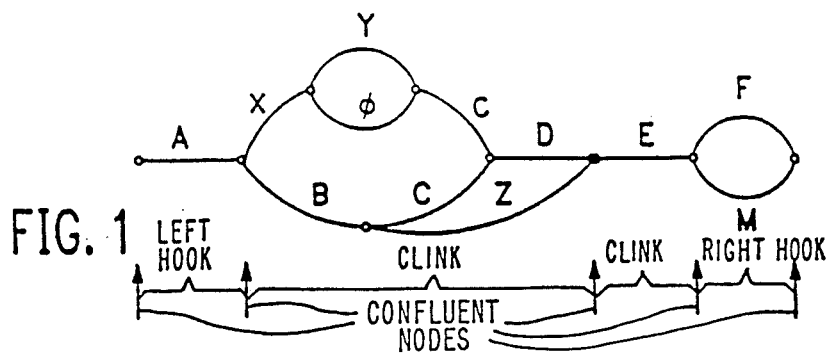
FIG. 1 is a schematic illustration of a phonetic graph for a single word.

For a hypothetical word having the baseform "ABCDEF", one possible phonetic graph representation is shown in FIG. 1. It can be seen that for the same portion (sound, letter, or sequence thereof) of the word, several pronunciations are possible. One path through the word model or phonetic graph corresponds to one pronunciation of the word.

Statistical Models, Recognition Process

To provide a tool for speech recognition, each word model is "trained", i.e., the word is uttered several times and statistics are made to obtain values indicating the probability that any path or any branch of the word graph is taken when the word is spoken. During actual speech recognition, each utterance is converted by a so-called "acoustic processor" to a string of acoustic labels. This label sequence is then compared to all the word models according to a specific procedure (e.g., Viterbi algorithm), and a probability value is generated in connection with each word, giving the probability that the label sequence to be recognized actually represents the word. The word for which the highest probability is obtained is then produced as output, or as the "recognized" word.

Combination of Words, Text Influence, Open-Ended Word Graphs

The above procedure is adequate for the recognition of single or isolated words. An important characteristic of continuous speech is, however, that the words are interconnected when uttered, and that the pronunciation of each particular word depends on context, based on which word is spoken before and which after, the particular word. Besides the task of determining word endings or boundaries, this causes specific problems which are addressed below.

Figure 2A:
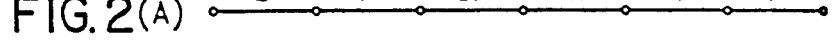
FIGS. 2(A), 2(B) and 2(C) show the simple phonetic strings for two separate words and a phonetic graph for the interconnection of both words.
Figure 2B:
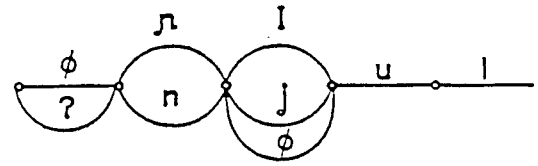
Figure 2C:
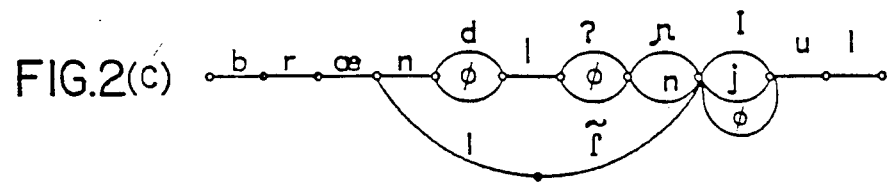

In FIG. 2(A) and 2(B) there are shown the phonetic graphs of two isolated words (BRAND and NEW), and the combined graph of the connected words. (The vertical slashes indicate word boundaries.) As can be seen, the binding of the words may change the pronunciation of the ending of the first word and of the beginning of the second word. In another context, each of the two words might have changed its beginning or ending in a different way than that shown in FIGS. 2(A) and 2(B).

Generally, there are a finite number of possibilities for each word to have its beginning and ending pronounced by connecting it to another word during an utterance. These possibilities can be incorporated into the phonetic graph or model of each word, as is shown in the example of FIG. 3 which is a phonetic graph of the word THOSE. Thus, instead of having a graph for each word which starts and ends in a single node (as would be correct for many singly spoken words), each word model will have several possible branches at its left and right end. This is also described in the above-mentioned articles by Cohen and Mercer.

Recognition Process with Open-Ended Graphs

Though the goal of speech recognition is to identify a sequence of individual words (which are elements of the given vocabulary), the recognition process for continuous speech must deal with an uninterrupted stream of phonemes. Therefore, during the recognition process, all possible interconnections of the last recognized word and each possible next word must be considered. Thus, according to given rules, the possible choices of phonemes connecting the last known word and each possible following word must be computed and evaluated "on the fly", i.e. during actual recognition. (This is also described in the above-mentioned articles.) As usual, the probabilities for several words to be one spoken in the unknown utterance are determined, and the word with the best probability is chosen as the next recognized word.

As a different graph or model must be stored for each word of the desired vocabulary, storage requirements are high because of the multiple open branches at the left and right end of each word and the necessary connection rules.

DESCRIPTION OF THE INVENTION

The invention suggests an improved way of phonetic representation of words that reduces storage requirements and simplifies the computational effort during the speech recognition process.

Separation Into Subgraphs (CLINKS)

As can be seen from FIG. 1, the phonetic graph of a word may have several points through which all possible pronunciation paths must pass (marked by arrows in the figure). Below is a printed representation of the word graph of FIG. 1, in which the common points are denoted by an asterisk.

```
       XYCD
       XCD
  * A * BCD * E * F *
       BZ    M
```

The common points are called "confluent nodes" and are indicated by arrows in FIG. 1. Each word is separated by the confluent nodes into sections. There is a left section (e.g. "A") and a right section

```
       F
  (e.g., )
       M
``` with a plurality of internal sections therebetween. Each internal section between two confluent nodes is a basic subgraph called a "confluent link" or in the abbreviated form, a "CLINK".

Besides one or more CLINKS, each word graph in a continuous speech context comprises a "LEFT HOOK" which is an open branch leading to the first internal confluent node, and a "RIGHT HOOK" which is the open branch starting in the last internal confluent node. Thus, each word in continuous speech can be represented as a sequence of CLINKS preceded by a LEFT HOOK and followed by a RIGHT HOOK.

As there is only a limited number of CLINKS, LEFT HOOKS and RIGHT HOOKS in any vocabulary, each of which may be used in several different word models, each CLINK, LEFT HOOK and RIGHT HOOK is stored only once as a phonetic graph (including statistics). Each word of the vocabulary is stored then as a sequence of code numbers identifying the sequence of CLINKS, etc. of which the respective word is constituted. This is a first step in reducing storage requirements for the desired vocabulary.

Precomputation of Boundary Links (BLINKS)

As was explained in the Cohen and Mercer articles, the combination of the graphs for two words results in a link between these words that is itself a phonetic subgraph. Using the above-introduced model representation comprising confluent links (CLINKS), LEFT HOOKS and RIGHT HOOKS, each connection of two words will actually result in the combination of a RIGHT HOOK and a LEFT HOOK which then constitutes a boundary subgraph between the last confluent node of the left word and the first confluent node of the right word. This subgraph is called a BOUNDARY LINK or BLINK.

Figure 4:
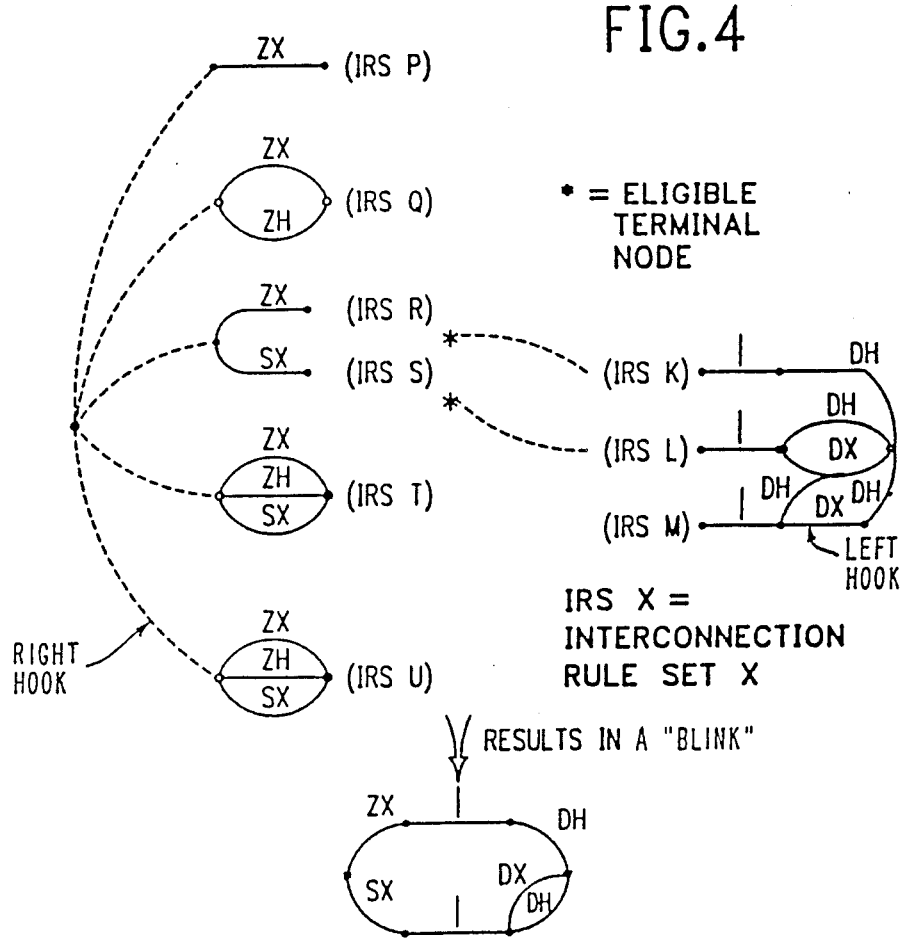
FIG. 4 illustrates the interconnection of respective branches of the two HOOKS of phonetic graphs resulting in a boundary subgraph or BLINK.

This process for connecting two words is schematically illustrated in FIG. 4. The example chosen is a connection of the word THOSE (graph in FIG. 3) to itself, as is done in the utterance "those those". In the upper left of the figure, there is shown the RIGHT HOOK of the word, and in the upper right there is shown the LEFT HOOK. To each branch, a particular set of rules applies that determines how and when the respective pronunciation can occur. In any particular connection, only a subset of the ending branches and starting branches, i.e., those that "fit" together, can be joined. The resulting BOUNDARY LINK in the chosen example is shown in the lower part of FIG. 4.

A second improvement now suggested is the precomputation of BOUNDARY LINKS or BLINKS that result as subgraphs from combining branches of a RIGHT HOOK with those of a LEFT HOOK. As was explained above, the words of a vocabulary can be stored each as a sequence of identifiers for a LEFT HOOK, a number of CLINKS, and a RIGHT HOOK, and the phonetic graph for each possible CLINK and HOOK is stored separately.

For the suggested precomputation of BLINKS, all possible connections of a RIGHT HOOK with a LEFT HOOK are evaluated. Assuming, for example, that 50 different RIGHT HOOKS and 30 different LEFT HOOKS are provided, the precomputation would result in a set of 1,500 BLINKS. In a normal vocabulary, many of these BLINKS will be equal, so that actually there may be only a few hundred different BLINKS.

A brief flowchart for the procedure of generating BLINKS from HOOK pairs, and for determining the CLINKS constituting each BLINK, is given in Appendix 1.

Reduction to CLINKS, Storing of Results

In a further step, BLINKS are converted into CLINKS (CONFLUENT LINKS). Each BLINK that contains internal confluent nodes (which may be the case for a small number of BLINKS) is decomposed into a sequence of CLINKS each spanning from one confluent node to another. Each BLINK which has no internal confluent nodes (which may be the case for the majority of BLINKS) is just considered a CLINK.

Thereafter, the set of CLINKS that resulted from the set of BLINKS is compared to the original set of CLINKS that was collected for representing the interior portions of all word models. The result will be that a number of those CLINKS that were based on the set of BLINKS can be eliminated because equivalent CLINKS were available already in the basic CLINK inventory for interior word portions. The new CLINKS (i.e. those not found in the basic CLINK inventory) will be added to the existing inventory of CLINKS in storage, with a respective identification assigned to each of them.

Another table of data will be added to storage as a result of the BLINK precomputation step. For each combination of a RIGHT HOOK with a LEFT HOOK, this table contains an identification of the resulting BLINK, and an identification of the CLINKS of which the respective BLINK is composed (which in many cases may be a single CLINK).

The tables or lists actually stored for a recognition vocabulary when the technique of the present invention is used are schematically represented in FIG. 5. In accordance with a particular embodiment of the invention, a commercially available IBM 370 computer is employed so that the various inventories are stored in corresponding locations in the IBM 370 memory.

(A) Word Inventory Each word of the vocabulary is stored in the form of a string of identifiers for a LEFT HOOK, a sequence of CLINKS, and a RIGHT HOOK as was mentioned above already. There may be empty HOOKS which are also stored but identified as being empty (numbered 00).

(B) Clink Inventory Each CLINK is stored as a phonetic graph whose branches represent phonemes. A graph may be stored in the form of a structure which is available in some programming languages. In addition to the structure, a table of probability values is stored that indicates for each branch of the structure its probability of occurring. These values are obtained in a training phase. The CLINK inventory comprises also the CLINKS that result from the BLINK precomputation procedure.

(C) Initial Hook Inventory Initially, there is an inventory of all LEFT HOOKS and RIGHT HOOKS that are identified in the word vocabulary. These HOOKS are also structures (phonetic graphs) like CLINKS but are open-ended on one side. In addition, there is a table for each HOOK that gives the connection rules which apply to each of the open branches. After precomputation of the BLINKS, this HOOK inventory will no longer be used.

(D) Hook Pair Inventory After precomputation of the BLINKS, there is stored for each RIGHT HOOK-LEFT HOOK combination an identification of the respective BLINK, and an identification of the CLINKS which constitute the respective BLINK. Thus, given a pair of a RIGHT HOOK and a LEFT HOOK, this table will provide the identifiers of the corresponding CLINKS which can then be fetched from the CLINK inventory for representing the resulting BLINK.

As can easily be seen, of the three inventories (A), (B), and (D) used for recognition, only one (CLINKS) needs extensive storage space whereas the two others (words, HOOK pairs) store only strings of identifiers each requiring only two bytes of storage.

Sample portions of a CLINK inventory are given in Appendix 2.

Recognition Procedure Using Precomputed BLINKS

Briefly restated, the recognition of continuous speech is effected preferably as follows:

(a) The speech signal is converted to a string of acoustic labels;

(b) each word is represented by a sequence of Markov models in the form of a word baseform. Each word baseform can be matched to the string of labels;

(c) for the matching procedure, a two-step technique described hereinbelow is preferably used.

First, a rough or fast match is made to obtain a subset of the words of the vocabulary that roughly correspond to the leading portion of the remaining label sequence;

then a detailed match procedure is made with the models or graphs of the candidate words selected in the fast match. The resulting probability values are then used to make the final selection of an output word. (A language model is also employed in the matching procedure).

In a continuous speech embodiment using the phonetic-graph-storing technique of the present invention, the recognition procedure is modified in the following way. Though the recognition is done word by word, the procedure actually steps from the last confluent node of one word to the last confluent node of the next word. This is done because the RIGHT HOOK of the last recognized word, which has an influence on the pronunciation of the next word in continuous speech must be available for recognizing the next word.

To continue the recognition procedure, the identifier string for each candidate word is fetched from storage. The LEFT HOOK identifier of a candidate word and the RIGHT HOOK identifier of the last recognized word are used as a pair to find, in the HOOK pair inventory, the identifiers of the CLINKS constituting the respective BLINK. Thereafter, these CLINK identifiers plus those from the string representing the internal portion of the respective candidate word are used to define a sequence of CLINK models (graphs) selected from the CLINK inventory. The obtained CLINK sequence corresponds to a label string which is then matched to the input label string using as a start-time distribution the end-time distribution of the previous step to obtain a probability value for the currently investigated candidate word.

This procedure is illustrated in FIG. 6, wherein, word N−1 is shown having a RIGHT HOOK (identified by RH36) which forms a boundary link with the LEFT HOOK (identified by LH25) of word N. Word N has CLINK 117, 085, and 187 along internal portions which extend between respective confluent links. CLINKS 117, 085, and 187 are from a predefined CLINK inventory. As noted above, word N is characterized by a model (or graph) that extends from the last confluent node of word N−1 to the last confluent node of word N. The first CLINK of the model, it is noted, is determined by pairing identifier RH36 of word N−1 with identifier LH25 of word N to find a corresponding predefined BLINK (BLINK 118). BLINK 118 corresponds to CLINK 267 in the CLINK inventory. CLINK 267 may be related solely to BLINKS or may also define an elementary graph that may be found between confluent nodes in the internal portion of a word.

In examining the BLINK formed by the RIGHT HOOK identified by RH64 of word N and by the LEFT HOOK identified by LH18 of N+1, it is observed that two CLINKS (CLINK 023 and CLINK 125) are required from the CLINK inventory to form the BLINK 169. When the BLINK 169 appears, it can be replaced by the series of CLINK 023 followed by CLINK 125.

To determine a sequence of words from a string of labels generated by an acoustic processor, a matching process is performed. According to the matching process, each word—as defined by the left HOOK thereof and the series of CLINKS thereafter up to the last confluent node—is treated as if it followed the right HOOK of the last recognized word. In FIG. 6, each word would be treated separately as if it followed RH36 of word N−1. That is, the LEFT HOOK of each word in the vocabulary is—one-by-one—linked to the RIGHT HOOK of word N−1 to form a BLINK which is followed by a series of appropriate CLINKS. The BLINK is converted into a CLINK or series of constituent CLINKS. Each CLINK may be viewed as a "phone" or phones configured in series/parallel arrangements. Each phone is assigned a corresponding Markov model phone machine. The phone machine or arrangement of phone machines for each CLINK is used in determining the probability of a given CLINK, or sequence of CLINKS, producing the labels, or fenemes, in a string generated by an acoustic processor as output. Briefly, the acoustic processor stores a set of speech prototypes. Each prototype represents a respective type of speech—based on predefined speech characteristics measured during a fixed interval of speech. When speech is uttered, the acoustic processor determines —for each speech interval—the stored prototype that best represents the interval of uttered speech. A label, or "feneme", identifying the determined prototype is generated for each successive interval of speech and represents output of the acoustic processor. The operation of the acoustic processor and the process of performing acoustic matching is discussed in U.S. Pat. No. 4,718,094—which was a copending application herewith.

According to the matching technique, when a particular label string is applied to a given phone machine, the given phone machine determines —from its stored data—the likelihood that the given phone machine produces the particular incoming labels in the string.

As described below, there are different types of phone machines depending on the data stored and used. First, there is a detailed match phone machine which incorporates predefined probabilities into a phone model. The detailed match phone machine is characterized by (a) a plurality of states and transitions between the states; (b) a probability associated with each transition, i.e, the probability that the particular transition occurs; and (c) a probability that, at a given transition, a particular label is generated by the phone. While the detailed match phone machine can be used in determining with great exactness how closely a phone matches incoming labels in a string, tremendous calculation demands attend the detailed match phone machine.

To overcome the calculation demands associated with the detailed match phone machine, a second phone machine is considered by the technique. The second phone machine, referred to as a basic fast match phone machine, makes an approximation that simplifies calculations relative to the detailed match phone machine. Specifically, wherever a given label has a probability of occurring at any transition in given phone, that probability is assigned a single specific value—which preferably is at least as large as the highest probability of the label occurring at any transition in the phone.

In a further embodiment, referred to as the alternative fast match, the probability of a phone generating a string of labels of any of a number of lengths is considered uniform by the phone machine corresponding thereto. In the alternative fast match phone machine, a minimum length and a maximum length are specified between which there is defined a uniform length distribution. In the alternative fast match phone machine, the probability of any length within the length distribution is replaced by a single defined value and the probability of any length outside the distribution is zero. The alternative fast match phone .machine can be applied to the basic fast match phone machine to further reduce the amount of calculation required in determining whether a word defined by a string of phone machines qualifies as a candidate word.

Preferably, in accordance with the present phonological graph invention, a list of words is extracted from the vocabulary of words by processing the words through either basic fast match phone machines or through alternative fast match phone machines that preferably include both label probability replacement values and length distribution replacement values. The words in the extracted list of words are thereafter processed by detailed match phone machines to arrive at a single word.

Alternatively, each word represented by CLINK phone machines may be matched using only detailed match phone machines. Increased processing and time requirements result.

Each of the above-noted phone machines, it should be realized, receives as inputs a start-time distribution and a string of labels and determines therefrom a match value which suggests the likelihood that a given phone produces a sequence of labels in the string.

A stack algorithm may be used for decoding, i.e., matching an input label string against word models.

Numerical Examples

Storage requirements for a system having a vocabulary of 5,000 words:
(a) In old scheme without precomputing BLINKS:
  For whole vocabulary: 634,000 Bytes
  For each additional word: 2,500 Bytes
(b) In new scheme using invention:
  For whole vocabulary: 72,500 Bytes
  For each additional word: 18-20 Bytes
Number of CLINKS and HOOKS:
For a vocabulary of 1,000 words (laser patents), the following elementary graphs were employed:
237 CLINKS
72 RIGHT HOOKS
40 LEFT HOOKS
Combination of the RIGHT and LEFT HOOKS resulted in 2,880 BLINKS of which many were equal. To compose each of the BLINKS, 122 new CLINKS were necessary in addition to the existing 237 CLINKS. Thus, the total CLINK inventory was 359 CLINKS after precomputation of the BLINKS.

A SPEECH RECOGNITION SYSTEM ENVIRONMENT FOR THE PRESENT INVENTION

General Description

Figure 7:
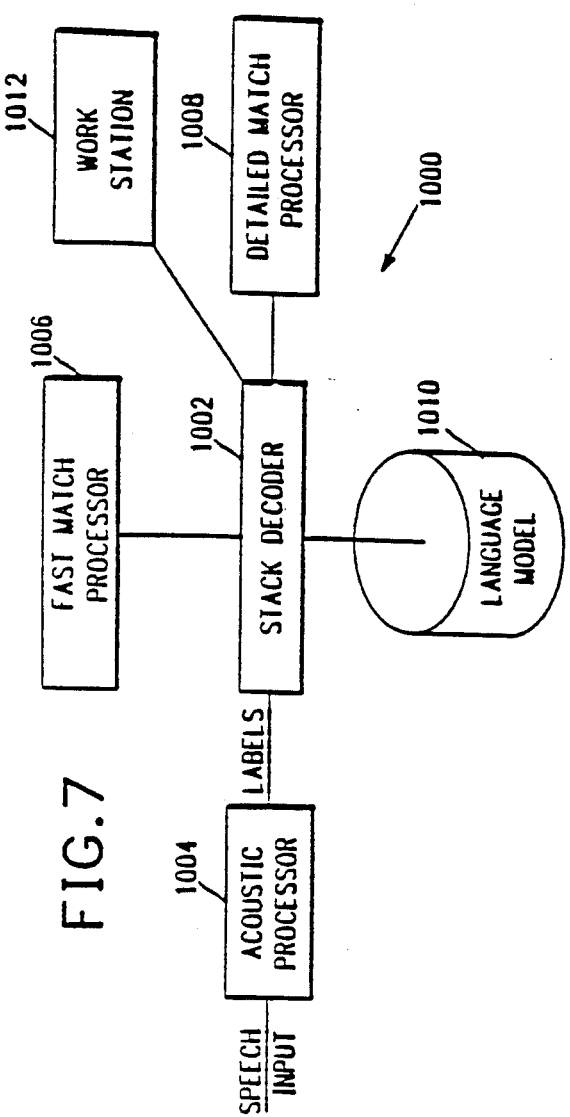
FIG. 7 is a general block diagram of a system environment in which the present invention may be practiced.

In FIG. 7, a general block diagram of a speech recognition system 1000 which provides an environment for the present invention is illustrated. The system 1000 includes a stack decoder 1002 to which are connected an acoustic processor (AP) 1004, an array processor 1006 used in performing a fast approximate acoustic match, an array processor 1008 used in performing a detailed acoustic match, a language model 1010, and a work station 1012.

The acoustic processor 1004 is designed to transform a speech waveform input into a string of labels, or fenemes, each of which in a general sense identifies a corresponding sound type. In the present system, the acoustic processor 1004 is based on a unique model of the human ear and is described in a patent application U.S. Ser. No. 655,401 entitled "Nonlinear Signal Processing in a Speech Recognition System", filed on Oct. 26, 1984.

Figure 8:
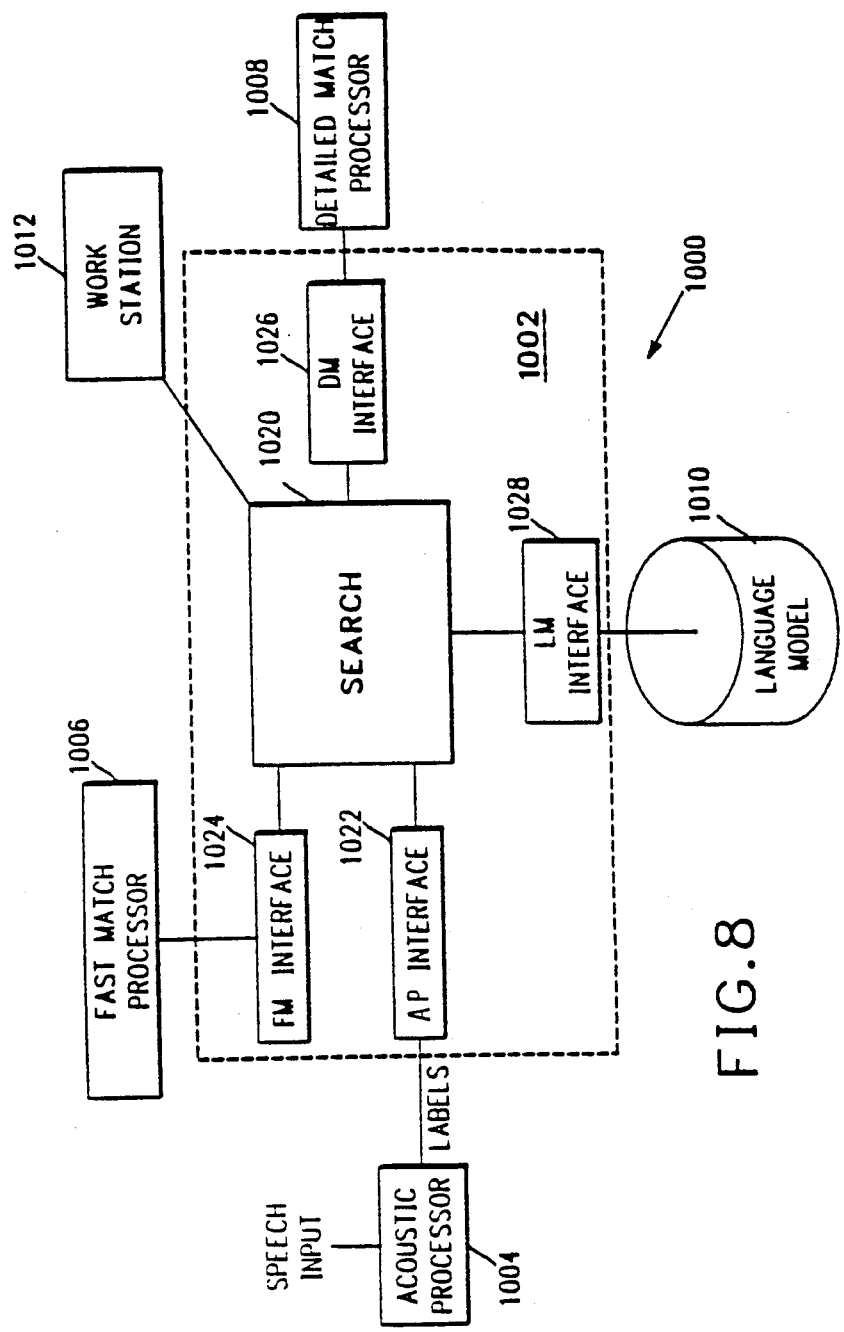
FIG. 8 is a block diagram of the system environment of FIG. 7, wherein the stack decoder is shown in greater detail.

The labels, or fenemes, from the acoustic processor 1004 enter the stack decoder 1002. In a logical sense, the stack decoder 1002 may be represented by the elements shown in FIG. 8. That is, the stack decoder 1002 includes a search element 1020 which communicates with the work station 1012 and which communicates with the acoustic processor process, the fast match processor process, the detailed match process, and the language model process through respective interfaces 1022, 1024, 1026, and 1028.

In operation, fenemes from the acoustic processor 1004 are directed by the search element 1020 to the fast match processor 1006. The fast match procedure is described hereinbelow as well as in the application entitled "Apparatus and Method for Performing Acoustic Matching". Briefly, the object of matching is to determine the most likely word (or words) for a given string of labels.

The fast match is designed to examine words in a vocabulary of words and to reduce the number of candidate words for a given string of incoming labels. The fast match is based on probabilistic finite state machines, also referred to herein as Markov models.

Preferably, the detailed match examines those words from the fast match candidate list which have a reasonable likelihood of being the spoken word based on the language model computations. The detailed match is discussed in the above-mentioned application entitled "Apparatus and Method for Performing Acoustic Matching". The detailed match is performed by means of Markov model phone machines such as that illustrated in FIG. 9.

After the detailed match, the language model is, preferably, again invoked to determine word likelihood.

The purpose of the stack decoder 1002 (FIG. 7) is to determine a word string W that has the highest probability given the string of labels $y_1 y_2 y_3 —$.

Mathematically, this is represented by the expression:

$$\text{Max } (Pr(W|Y)) \tag{1}$$

the maximum probability of W given Y over all word strings W. As is well known, the probability $Pr(W|Y)$ can be written as:

$$Pr(W|Y) = Pr(W) \times Pr(Y|W)/Pr(Y) \tag{2}$$

where $Pr(Y)$ is independent of W.

One approach to determining the most likely path (or sequence) of successive words $W^*$ is to look at each possible path and determine the probability of each such path producing the string of labels that is being decoded. The path having the highest probability associated therewith is then selected. With a 5000 word vocabulary, this approach becomes unwieldy, especially when the sequence of words is lengthy.

Two other commonly known approaches for finding the most likely word sequence $W^*$ are Viterbi decoding and stack decoding. Each of these techniques is described in an article entitled "A Maximum Likelihood Approach to, Continuous Speech Recognition", IEEE Transactions on Pattern Analysis and Machine Intelligence", vol. PAMI-5, No. 2, March, 1983, at sections V and VI respectively.

The stack decoding technique in the article relates to single stack decoding. That is, paths of varying length are listed in a single stack according to likelihood and decoding is based on the single stack. Single stack decoding must account for the fact that likelihood is somewhat dependent on path length and, hence, normalization is generally employed. Normalization, however, can result in excessive searching and search errors due to inadequate searching if the normalization factor is not properly estimated.

The Viterbi technique, while not requiring normalization, is generally practical for only small tasks. In large vocabulary applications, the Viterbi algorithm which is basically time synchronous may have to be interfaced with an acoustic matching component which is asynchronous. In this event, the resulting interface is not neat.

An alternative novel apparatus and methodology invent=d by L. R. Bahl, F. Jelinek, and R. L. Mercer relates to methodology whereby the most probable word sequence $W^*$ can be decoded with low computational requirements and high accuracy relative to other techniques. Specifically, a technique is provided which features multi-stack decoding and a unique decision strategy to determine which sequence of words should be extended at a given time. In accordance with the decision strategy, a path of relatively short length is not penalized because of its shortness but is, instead, judged on its relative likelihood.

Figure 11:
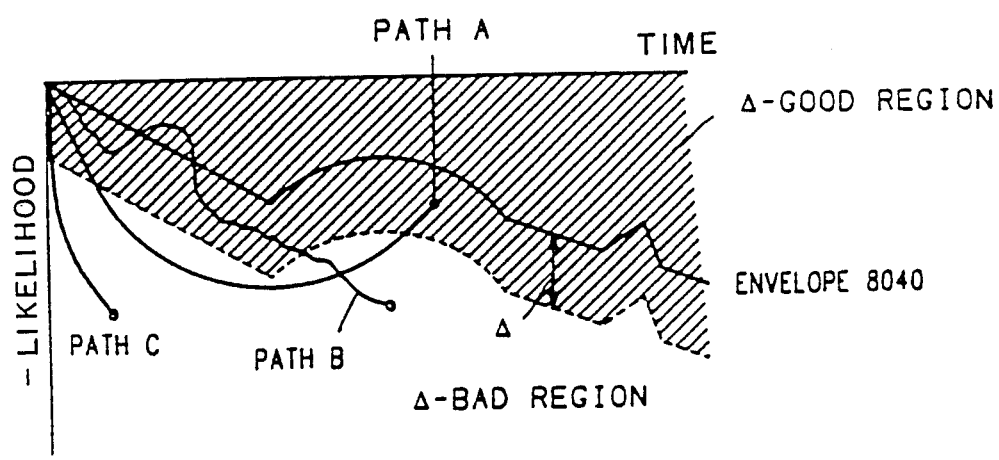
FIG. 11 is a graph illustrating a stack decoding technique.
Figure 10:
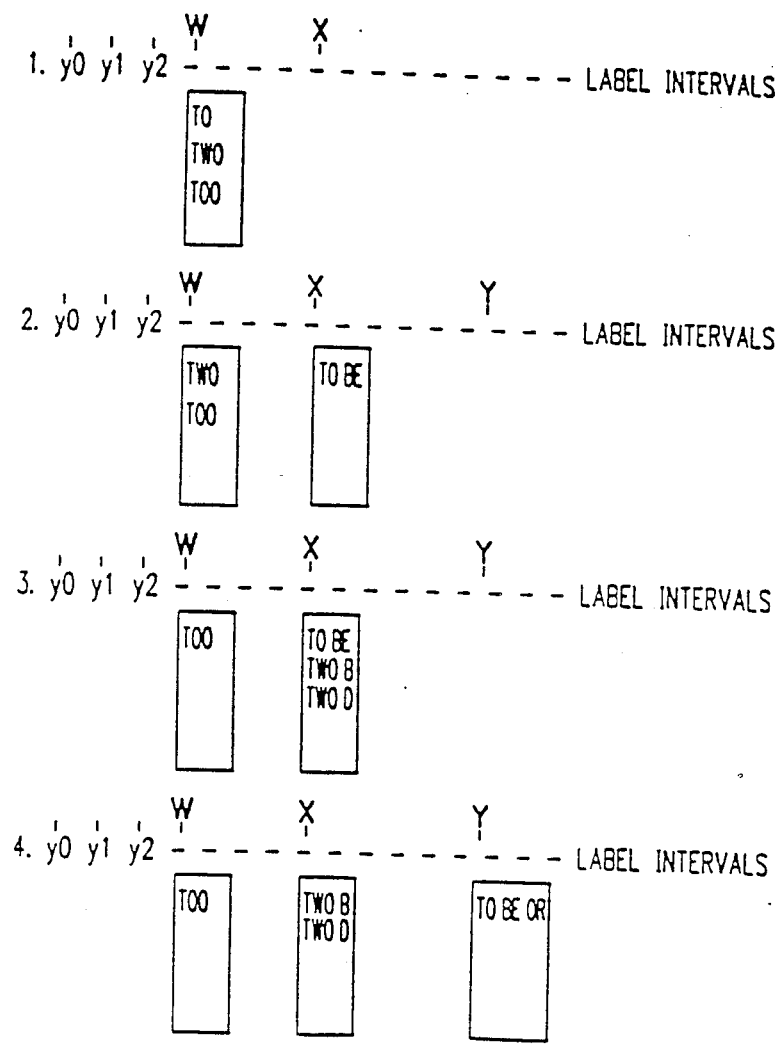
FIG. 10 is an illustration showing successive steps 1 through 4 of stack decoding.
Figure 12:
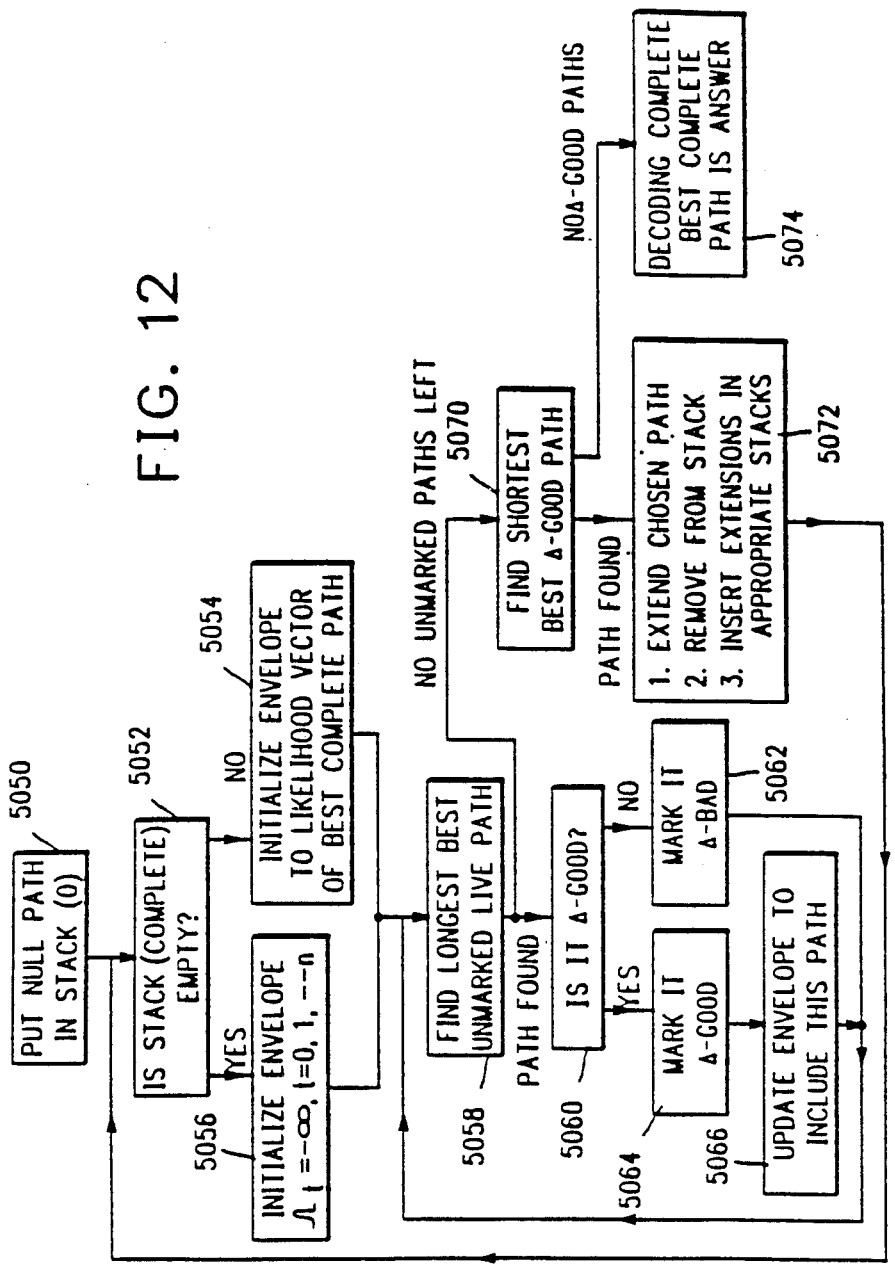
FIG. 12 is a flowchart showing a stack decoding technique.

This apparatus and methodology are illustrated in FIGS. 10, 11, and 12 (discussed hereinbelow).

The stack decoder 1002, in effect, serves to control the other elements but does not perform many computations. Hence, the stack decoder 1002 preferably includes an IBM 4341 computer running under the IBM VM/370 operating system (Model 155, VS2, Release 1.7). The array processors which perform considerable computation have been implemented with Floating Point System (FPS) 190L's, which are commercially available.

Figure 13:
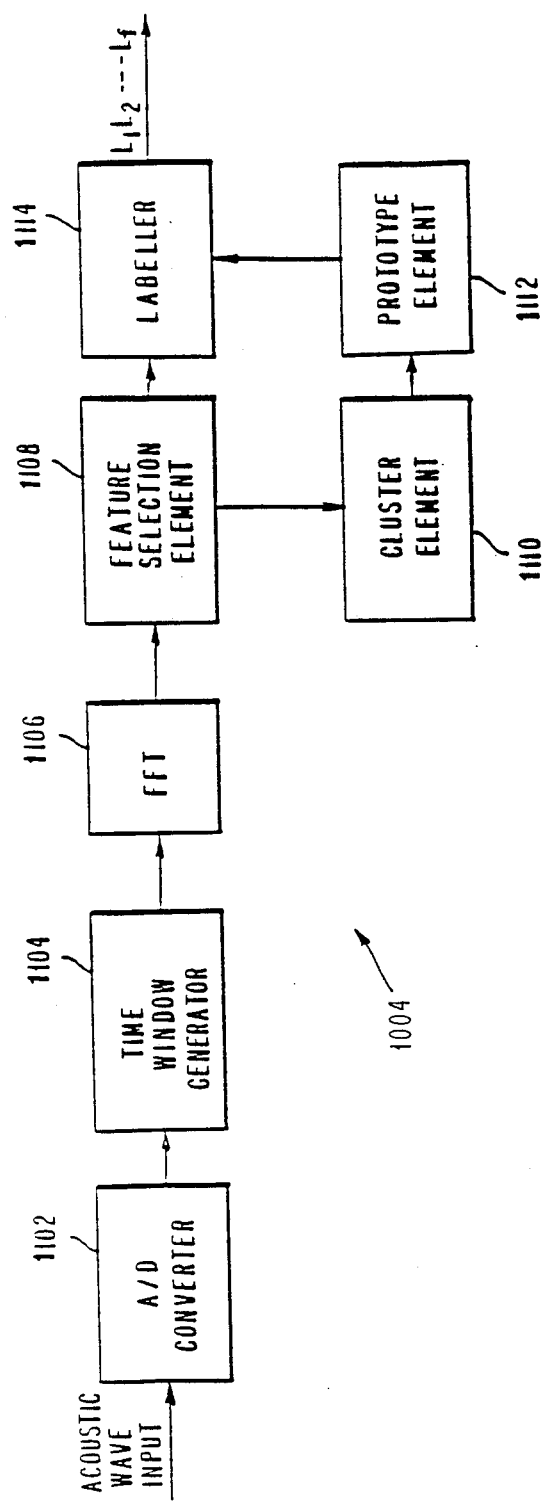
FIG. 13 is an illustration depicting the elements of an acoustic processor.

The Auditory Model and Implementation Thereof In An Acoustic Processor Of a Speech Recognition System In FIG. 13, a, specific embodiment of an acoustic processor 1004, as described above, is illustrated. An acoustic wave input (e.g., natural speech) enters an analog-to-digital converter 1102 which samples at a prescribed rate.

A typical sampling rate is one sample every 50 microseconds. To shape the edges of the digital signal, a time window generator 1104 is provided. The output of the window 1104 enters a fast Fourier transform (FFT) element 1106 which provides a frequency spectrum output for each time window.

The output of the FFT element 1106 is then processed to produce labels $L_1 L_2 - L_f$. Four elements—a feature selection element 1108, a cluster element 1110, a prototype element 1112, and a labeller 1114—coact to generate the labels. In generating the labels, prototypes are defined as points (or vectors) in the space based on selected features. Acoustic inputs are then characterized by the same selected features to provide corresponding points (or vectors) in space that can be compared to the prototypes.

Specifically, in defining the prototypes, sets of points are grouped together in clusters by element 1110. Methods for defining clusters have been based on probability distributions—such as a Gaussian distribution—applied to speech. The prototype of each cluster—relating to the centroid or other characteristic of the cluster—is generated by the prototype element 1112. The generated prototypes and acoustic input—both characterized by the same selected features—enter the labeller 1114. The labeller 1114 performs a comparing procedure which results in assigning a label to a particular acoustic input.

The selection of appropriate features is a key factor in deriving labels which represent the acoustic (speech) wave input. The acoustic processor relates to an improved feature selection element 1008. In accordance with the acoustic processor, a unique auditory model is derived and applied. In explaining the auditory model, reference is made to FIG. 14.

Figure 14:
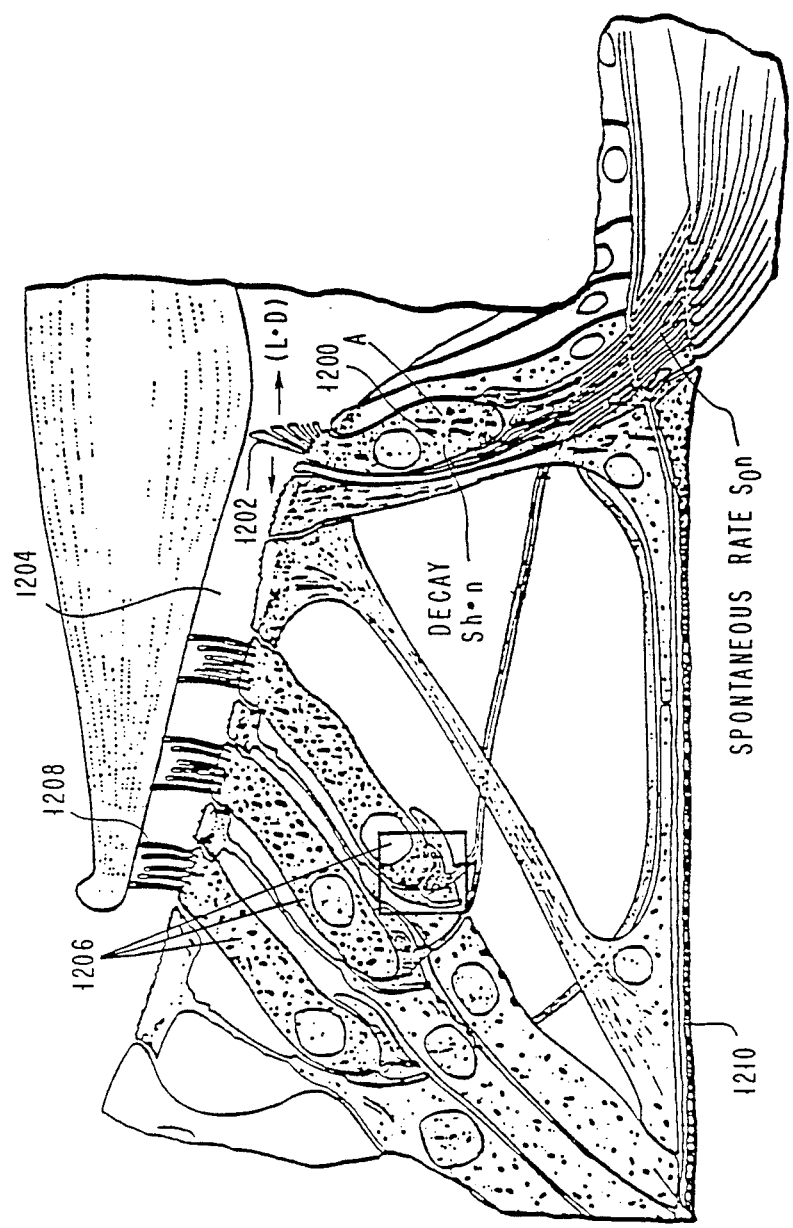
FIG. 14 is an illustration of a typical human ear indicating where components of an acoustic model are defined.

FIG. 14 shows part of the inner human ear. Specifically, an inner hair cell 1200 is shown with end portions 1202 extending therefrom into a fluid-containing channel 1204. Upstream from inner hair cells are outer hair cells 1206 also shown with end portions 1208 extending into the channel 1204. Associated with the inner hair cell 1200 and outer hair cells 1206 are nerves which convey information to the brain for processing. Specifically, neurons undergo electrochemical changes which result in electrical impulses being conveyed along a nerve to the brain for processing. Effectuation of the electrochemical changes is stimulated by the mechanical motion of the basilar membrane 1210.

It has been recognized, in prior teachings, that the basilar membrane 1210 serves as a frequency analyzer for acoustic waveform inputs and that portions along the basilar membrane 1210 respond to respective critical frequency bands. That different portions of the basilar membrane 1210 respond to corresponding frequency bands has an impact on the loudness perceived for an acoustic waveform input. That is, the loudness of tones is perceived to be greater when two tones are in different critical frequency bands than when two tones of similar power intensity occupy the same frequency band. In has been found that there are on the order of twenty-two critical frequency bands defined by the basilar membrane 1210.

Conforming to the frequency-response of the basilar membrane 1210, the present acoustic processor 1004 in its preferred form resolves the acoustic waveform input into some or all of the critical frequency bands and then examines the signal component for each defined critical frequency band separately. This function is achieved by appropriately filtering the signal from the FFT element 1106 (see FIG. 13) to provide a separate signal in the feature selection element 1108 for each examined critical frequency band.

The separate inputs, it is noted, have also been blocked into time frames (of preferably 25.6 msec) by the time window generator 1104. Hence, the feature selection element 1108 preferably includes twenty-two signals—each of which represents sound intensity in a given frequency band for one frame in time after another.

Figure 15:
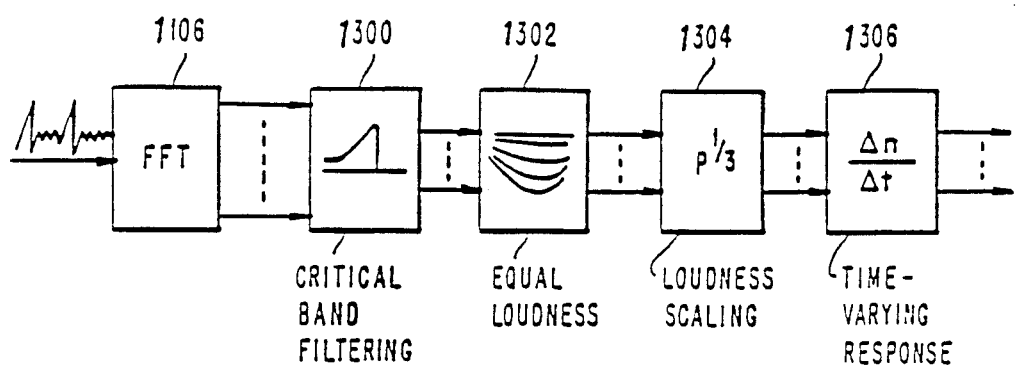
FIG. 15 is a block diagram showing portions of the acoustic processor.
Figure 16:
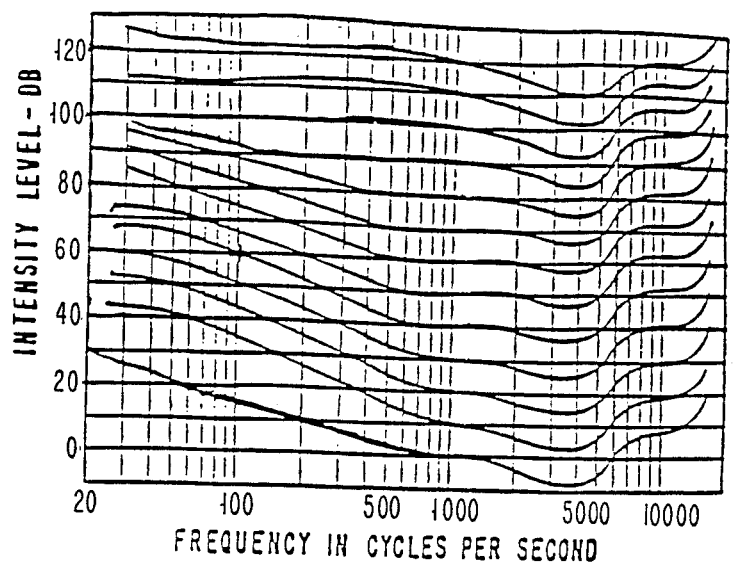
FIG. 16 is a graph showing sound intensity versus frequency, the graph being used in the design of the acoustic processor.

The filtering is preferably performed by a conventional critical band filter 1300 of FIG. 15. The separate signals are then processed by an equal loudness converter 1302 which accounts for perceived loudness variations as a function of frequency. In this regard, it is noted that a first tone at a given dB level at one frequency may differ in perceived loudness from a second tone at the same given dB level at a second frequency. The converter 1302 can be based on empirical data, converting the signals in the various frequency bands so that each is measured by a similar loudness scale. For example, the converter 1302 preferably maps from acoustic power to equal loudness based on studies of Fletcher and Munson in 1933, subject to certain modifications. The modified results of these studies are depicted in FIG. 16. In accordance with FIG. 16, a 1KHz tone at 40 dB is comparable in loudness level to a 100 Hz tone at 60 dB as shown by the X in the figure.

The converter 1302 adjusts loudness preferably in accordance with the contours of FIG. 16 to effect equal loudness regardless of frequency.

In addition to dependence on frequency, power changes and loudness changes do not correspond as one looks at a single frequency in FIG. 16. That is, variations in the sound intensity, or amplitude, are not at all points reflected by similar changes in perceived loudness. For example, at 100 Hz, the perceived change in loudness of a 10 dB change at about 110 dB is much larger than the perceived change in loudness of a 10 dB change at 20 dB. This difference is addressed by a loudness scaling element 1304 which compresses loudness in a predefined fashion.

Preferably, the loudness scaling element compresses power P by a cube-root factor to $P^{1/3}$ by replacing loudness amplitude measure in phons by sones.

Figure 17:
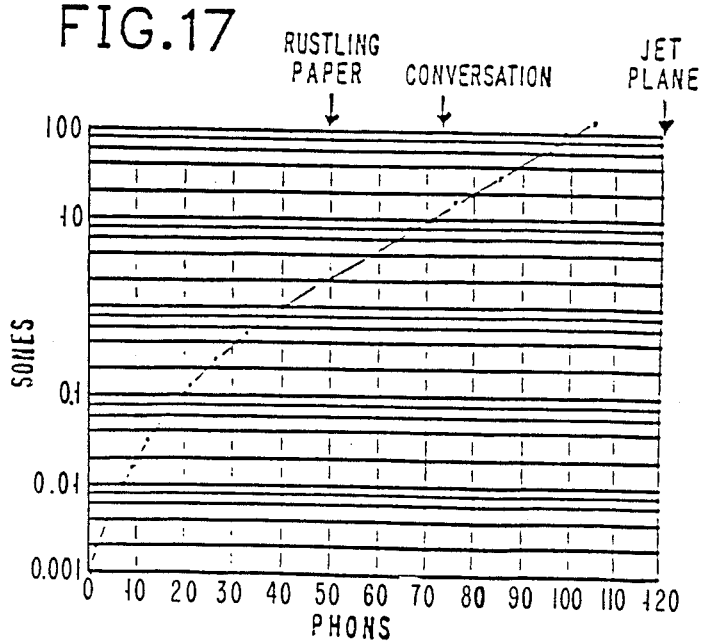
FIG. 17 is a graph showing the relationship between sones and phons.

FIG. 17 illustrates a known representation of phons versus sones determined empirically. By employing sones, the present model remains substantially accurate at large speech signal amplitudes. One sone, it should be recognized, has been defined as the loudness of a 1 KHz tone at 40 dB.

Referring again to FIG. 15, a novel time varying response element 1306 is shown which acts on the equal loudness, loudness scaled signals associated with each critical frequency band. Specifically, for each frequency band examined, a neural firing rate f is determined at each time frame. The firing rate f is defined in accordance with the present acoustic processor as:

$$f = (S_o + DL)n \tag{1}$$

where n is an amount of neurotransmitter; So is a spontaneous firing constant which relates to neural firings independent of acoustic waveform input; L is a measurement of loudness; and D is a displacement constant.

So × n corresponds to the spontaneous neural firing rate which occurs whether or not there is an acoustic wave input and DLn corresponds to the firing rate due to the acoustic wave input.

Significantly, the value of n is characterized by the present invention as changing over time according to the relationship:

$$dn/dt = Ao - (So + Sh + DL)n \quad (2)$$

where Ao is a replenishment constant and Sh is a spontaneous neurotransmitter decay constant. The novel relationship set forth in equation (2) takes into account that neurotransmitter is being produced at a certain rate (Ao) and is lost (a) through decay (Sh×n), (b) through spontaneous firing (So×n), and (c) through neural firing due to acoustic wave input (DL×n). The presumed locations of these modeled phenomena are illustrated in FIG. 14.

Equation (2) also reflects the fact that the present invention is non-linear in that the next amount of neurotransmitter and the next firing rate are dependent multiplicatively on the current conditions of at least the neurotransmitter amount. That is, the amount of neurotransmitter at a state $(t + \Delta t)$ is equal to the amount of neurotransmitter at a state t plus dn/dt, or:

$$n(t + \Delta t) = n(t) + dn/dt \Delta t \quad (3)$$

Equations (1), (2), and (3) describe a time varying signal analyzer which, it is suggested, addresses the fact that the auditory system appears to be adaptive over time, causing signals on the auditory nerve to be non-linearly related to acoustic wave input. In this regard, the present invention provides the first model which embodies non-linear signal processing in a speech recognition system, so as to better conform to apparent time variations in the nervous system.

In order to reduce the number of unknowns in equations (1) and (2), the present invention uses the following equation (4) which applies to fixed loudness L:

$$So + Sh + DL = 1/T \quad (4)$$

T is a measure of the time it takes for an auditory response to drop to 37% of its maximum after an audio wave input is generated. T, it is noted, is a function of loudness and is, according to the invention, derived from existing graphs which display the decay of the response for various loudness levels. That is, when a tone of fixed loudness is generated, it generates a response at a first high level after which the response decays toward a steady condition level with a time constant T. With no acoustic wave input, $T = T_0$ which is on the order of 50 msec. For a loudness of $L_{max}$, $T = T_{max}$ which is on the order of 30 msec. By setting $Ao = 1$, $1/(So + Sh)$ is determined to be 5 csec, when $L = 0$. When L is $L_{max}$ and $L_{max} = 20$ sones, equation (5) results:

$$So + Sn + D(20) = 1/30 \quad (5)$$

With the above data and equations, So and Sh are defined by equations (6) and (7) as:

$$So = DL_{max}/(R + (DL_{max}T_oR) - 1) \quad (6)$$

$$Sh = 1/T_o - So \quad (7)$$

where $$R = \frac{f_{steady\ state}|L_{max}}{f_{steady\ state}|L = 0} \quad (8)$$

$f_{steady\ state}$ represents the firing rate at a given loudness when dn/dt is zero.

R, it is noted, is the only variable left in the acoustic processor. Hence, to alter the performance of the processor, only R is changed. R, that is, is a single parameter which may be adjusted to alter performance which, normally, means minimizing steady state effects relative to transient effects. It is desired to minimize steady state effects because inconsistent output patterns for similar speech inputs generally result from differences in frequency response, speaker differences, background noise, and distortion which affect the steady state portions of the speech signal but not the transient portions. The value of R is preferably set by optimizing the error rate of the complete speech recognition system. A suitable value found in this way is $R = 1.5$. Values of So and Sh are then 0.0888 and 0.11111 respectively, with D being derived as 0.00666.

Figure 18:
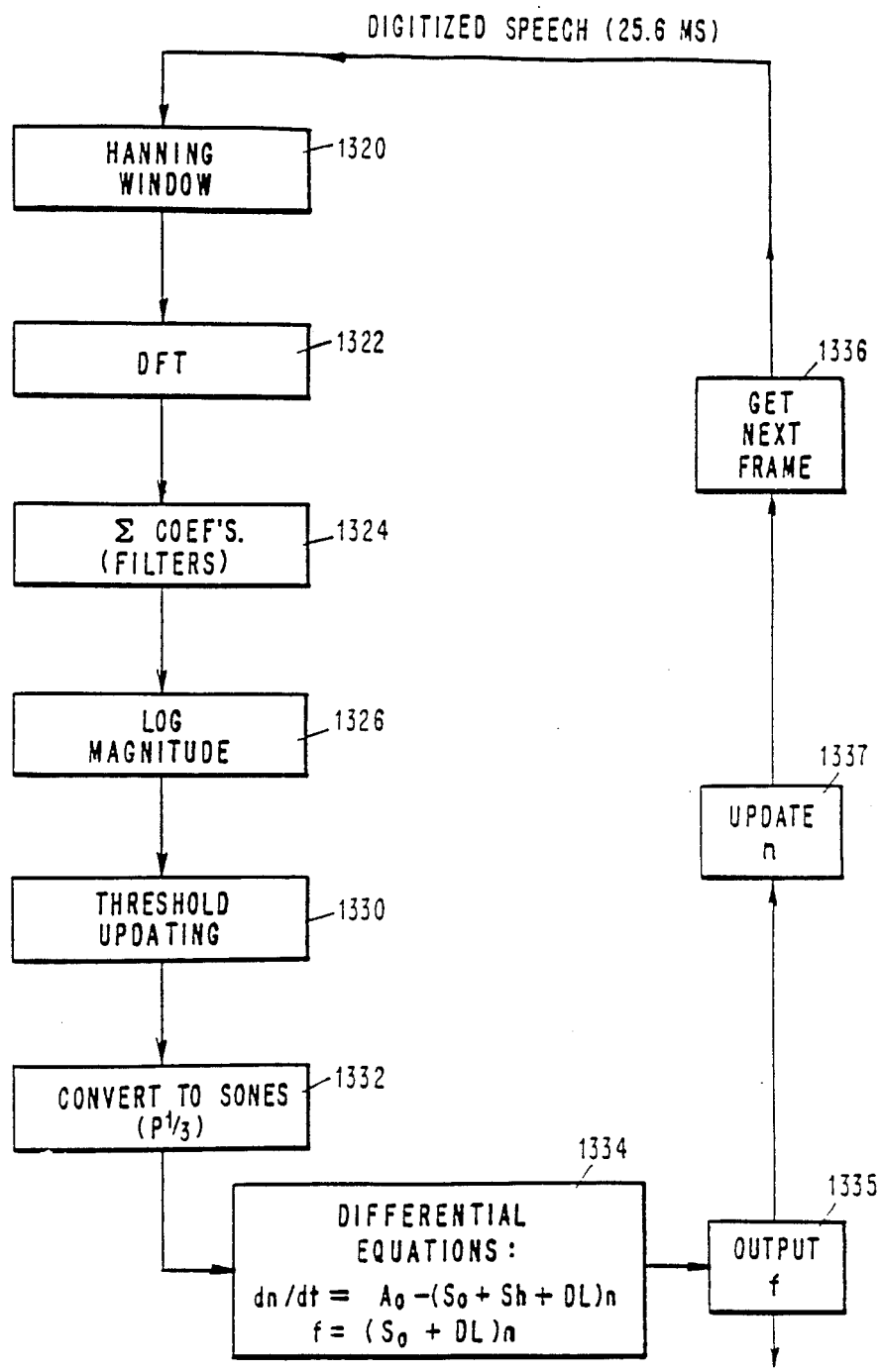
FIG. 18 is a flowchart representation showing how sound is characterized according to the acoustic processor of FIG. 13.

Referring to FIG. 18, a flowchart of the present acoustic processor is depicted. Digitized speech in a 25.6 msec time frame, sampled at preferably 20 KHz passes through a Hanning Window 1320 the output from which is subject to a Dual Fourier Transform 1322, taken at preferably 10 msec intervals. The transform output is filtered by element 1324 to provide a power density output for each of at least one frequency band—preferably all the critical frequency bands or at least twenty thereof. The power density is then transformed from log magnitude 1326 to loudness level. This is performed either by the modified graph of FIG. 16 or based on threshold derived by the process outlined hereafter and depicted in FIG. 19.

Figure 19:
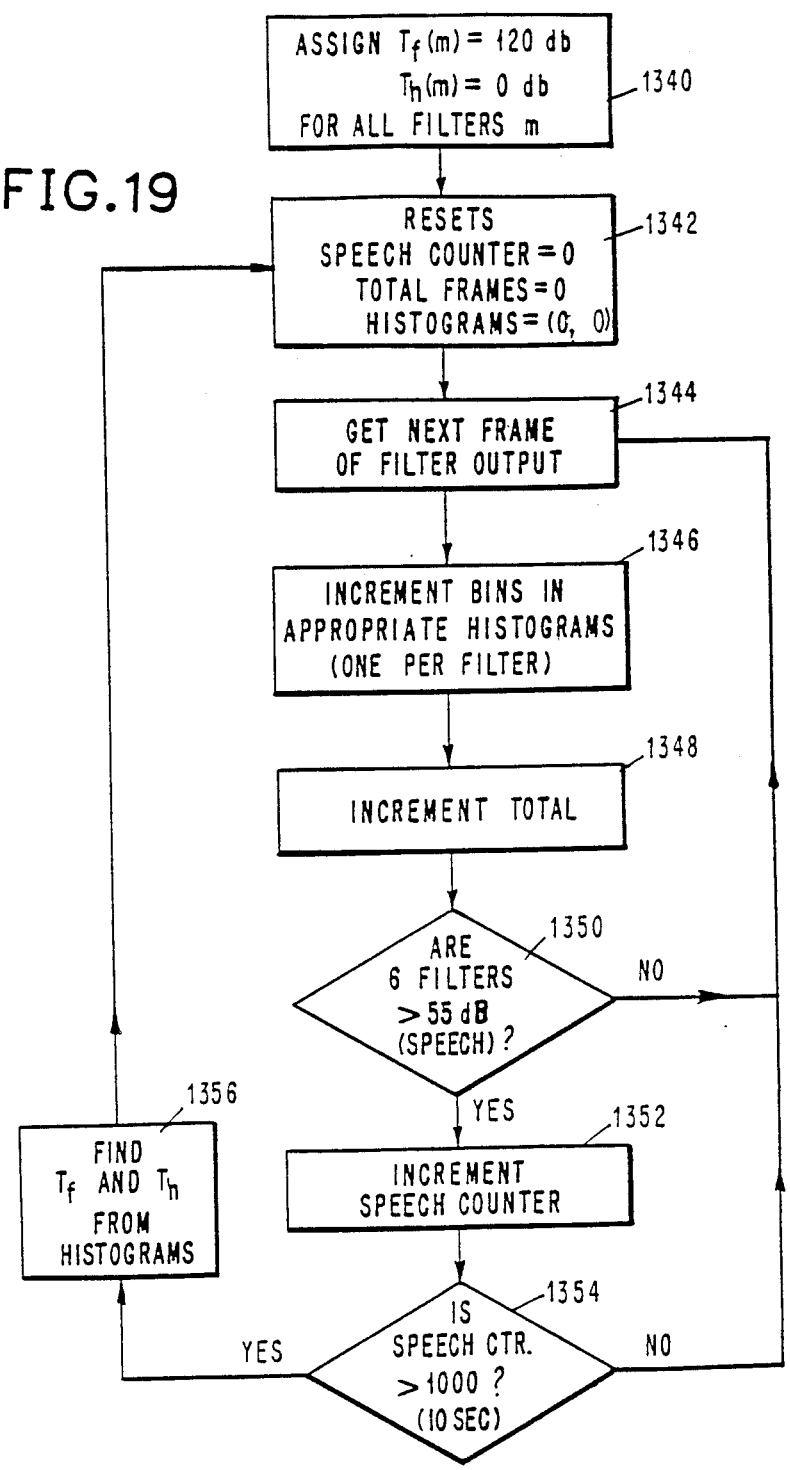
FIG. 19 is a flowchart representation showing how thresholds are updated in FIG. 18.

In FIG. 19, a threshold-of-feeling $T_f$ and a threshold-of-hearing $T_h$ are initially defined (at step 1340) for each filtered frequency band m to be 120 dB and 0 dB respectively. Thereafter, a speech counter, total frames register, and a histogram register are reset at step 1342.

Each histogram includes bins, each of which indicates the number of samples or counts during which power or some similar measure—in a given frequency band—is in a respective range. A histogram in the present instance preferably represents—for each given frequency band—the number of centiseconds during which loudness is in each of a plurality of loudness ranges. For example, in the third frequency band, there may be twenty centiseconds between 10 dB and 20 dB in power. Similarly, in the twentieth frequency band, there may be one hundred fifty out of a total of one thousand centiseconds between 50 dB and 60 dB. From the total number of samples (or centiseconds) and the counts contained in the bins, percentiles are derived.

A frame from the filter output of a respective frequency band is examined at step 1344 and bins in the appropriate histograms—one per filter—are incremented at step 1346. The total number of bins in which the amplitude exceeds 55 dB are summed for each filter (i.e., frequency band) at step 1348 and the number of filters indicating the presence of speech is determined. If there is not a minimum of filters (e.g. six of twenty) to suggest speech, the next frame is examined at step 1344. If there are enough filters to indicate speech at step 1350, a speech counter is incremented at step 1352. The speech counter is incremented at step 1352 until 10 seconds of speech have occurred at step 1354 whereupon new values for $T_f$ and $T_h$ are defined for each filter at step 1356.

The new $T_f$ and $T_h$ values are determined for a given filter as follows. For $T_f$, the dB value of the bin holding the 35th sample from the top of 1000 bins (i.e. the 96.5th percentile of speech) is defined as $BIN_H$. $T_f$ is then set as: $T_f = BIN_H + 40$ dB. For $T_h$, the dB value of the bin holding the (0.01) (TOTAL BINS—SPEECH COUNT) the value from the lowest bin is defined as $BIN_L$. That is, $BIN_L$ is the bin in the histogram which is 1% of the number of samples in the histogram excluding the number of samples classified as speech. $T_h$ is then defined as: $T_h = BIN_L - 30$ dB.

Returning to FIG. 18, the sound amplitudes are converted to sones and scaled based on the updated thresholds (steps 1330 and 1332) as described hereinbefore. An alternative method of deriving sones and scaling is by taking the filter amplitudes "a" (after the bins have been incremented) and converting to dB according to the expression:

$$a^{dB} = 20 \log_{10}(a) - 10 \quad (9)$$

Each filter amplitude is then scaled to a range between 0 and 120 dB to provide equal loudness according to the expression:

$$a^{eql} = 120(a^{dB} - T_h)/(T_f - T_h) \quad (10)$$

$a^{eql}$ is then preferably converted from a loudness level (phons) to an approximation of loudness in sones (with a 1 KHz signal at 40 dB mapping to 1) by the expression:

$$L^{dB} = (a^{eql} - 30)/4 \quad (11)$$

Loudness in sones is then approximated as:

$$L_s(appr) = 10(L^{dB})/20 \quad (12)$$

The loudness in sones $L_s$ is then provided as input to the equations (1) and (2) at step 1334 to determine the output firing rate f for each frequency band. With twenty-two frequency bands, a twenty-two dimension vector characterizes the acoustic wave inputs over successive time frames. Generally, however, twenty frequency bands are examined by employing a conventional mel-scaled filter bank.

Prior to processing the next time frame, the next state of n is determined in accordance with equation (3) in step 1337.

The acoustic processor hereinbefore described is subject to improvement in applications where the firing rate f and neurotransmitter amount n have large DC pedestals. That is, where the dynamic range of the terms of the f and n equations is important, the following equations are derived to reduce the pedestal height.

In the steady state, and in the absence of an acoustic wave input signal (L=0), equation (2) can be solved for a steady-state internal state n':

$$n' = A/(So + Sh) \quad (13)$$

The internal state of the neurotransmitter amount n(t) can be represented as a steady state portion and a varying portion:

$$n(t) = n' + n''(t) \quad (14)$$

Combining equations (1) and (14), the following expression for the firing rate results;

$$f(t) = (So + D \times L)(n' + n''(t)) \quad (15)$$

The term $So \times x \, n'$ is a constant, while all other terms include either the varying part of n or the input signal represented by $(D \times L)$. Future processing will involve only the squared difference between output vectors, so that constant terms may be disregarded. Including equation (13) for n', we get $$f'(t) = (So + D \times L) \times \\ ((n''(t) + Dx\text{-}LxA)/\text{-}(So + Sh)) \quad (16)$$

Considering equation (3), the next state becomes;

$$n(t + \Delta t) = n'(t + \Delta t) + n''(t + \Delta\delta) \quad (17)$$

$$= n''(t) + A - (So + Sh + DxL) \times (n' + n''(t)) \quad (18)$$

$$-n''(t) - (Sh \times n''(t)) - (So + Ao \times L^A)n''(t)$$

$$-(Ao \times L^A x\, D)/(So + Ao\, Sh) + Ao \quad (19)$$

$$-(So \times Ao) + ((Sh \times Ao) + (Sh \times Ao/So + Sh))$$

This equation (19) may be rewritten, ignoring all constant terms, as:

$$n''(t + \Delta t) = n''(t)(1 - So\, t) - f'(t) \quad (20)$$

Equations (15) and (20) now constitute the output equations and state-update equations applied to each filter during each 10 millisecond time frame. The result of applying these equations is a 10 element vector each 10 milliseconds, each element of the vector corresponding to a firing rate for a respective frequency band in the mel-scaled filter bank.

With respect to the embodiment set forth immediately hereinabove, the flowchart of FIG. 17 applies except that the equations for f, dn/dt, and n(t+1) are replaced by equations (11) and (16) which define special case expressions for firing rate f and next state n (t+Δt) respectively.

It is to be noted that the values attributed to the terms in the various equations (namely $t_o = 5$ csec, $t_L = 3$ csec, Ao=1, R=1.5, and $L_{max}=(20)$ may be set otherwise and the terms So, Sh, and D may differ from the preferably reviewed values of 0.0888, 0.111111, and 0.00666, respectively, as other terms are set differently.

The present acoustic model has been practiced using the PL/I programming language with Floating Point Systems FPS 190 L hardware; however, it may be practiced by various other software or hardware approaches.

Detailed Match

Figure 9:
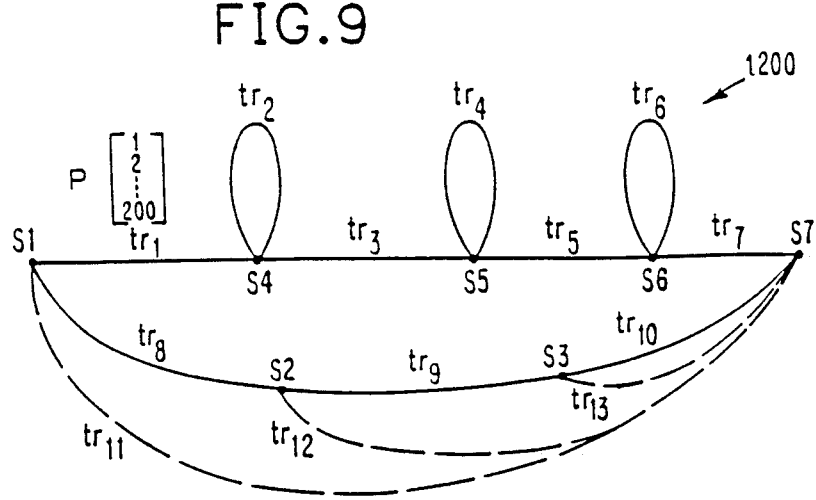
FIG. 9 is an illustration of a detailed match phone machine which is identified in storage and represented therein by statistics obtained during a training session.

In FIG. 9, a sample detailed match phonetic phone machine 1200 is depicted. Each detailed match phone machine is a probabilistic finite-state machine characterized by (a) a plurality of states $S_i$, (b) a plurality of transitions $tr(S_j \to S_i)$, some of the transitions extending between different states and some extending from a state back to itself, each transition having associated therewith a corresponding probability, and (c) for each label that can be generated at a particular transition, a corresponding actual label probability.

In FIG. 9, seven states $S_1$ through $S_7$ are provided and thirteen transitions tr1 through tr13 are provided in the detailed match phone machine 1200. A review of FIG. 9 shows that phone machine 1200 has three transitions with dashed line paths, namely transitions tr11, tr12, and tr13. At each of these three transitions, the phone can change from one state to another without producing a label and such a transition is, accordingly, referred to as a null transition. Along transitions tr1 through tr10 labels can be produced. Specifically, along each transition tr1 through tr10, one or more labels may have a distinct probability of being generated thereat. Preferably, for each transition there is a probability associated with each label that can be generated in the system. That is, if there are two hundred labels that can be selectively generated by the acoustic channel, each transition (that is not a null) has two hundred "actual label probabilities" associated therewith—each of which corresponds to the probability that a corresponding label is generated by the phone at the particular transition. The actual label probabilities for transition tr1 are represented by the symbol p followed by the bracketed column of numerals 1 through 200, each numeral representing a given label. For label 1, there is a probability p [1] that the detailed phone machine 2000 generates the label 1 at transition tr1. The various actual label probabilities are stored with relation to the label and a corresponding transition.

When a string of labels $y_1 y_2 y_3$—is presented to a detailed match phone machine 1200 corresponding to a given phone, a match procedure is performed. The procedure associated with the detailed match phone machine is explained with reference to FIG. 20.

Figure 20:
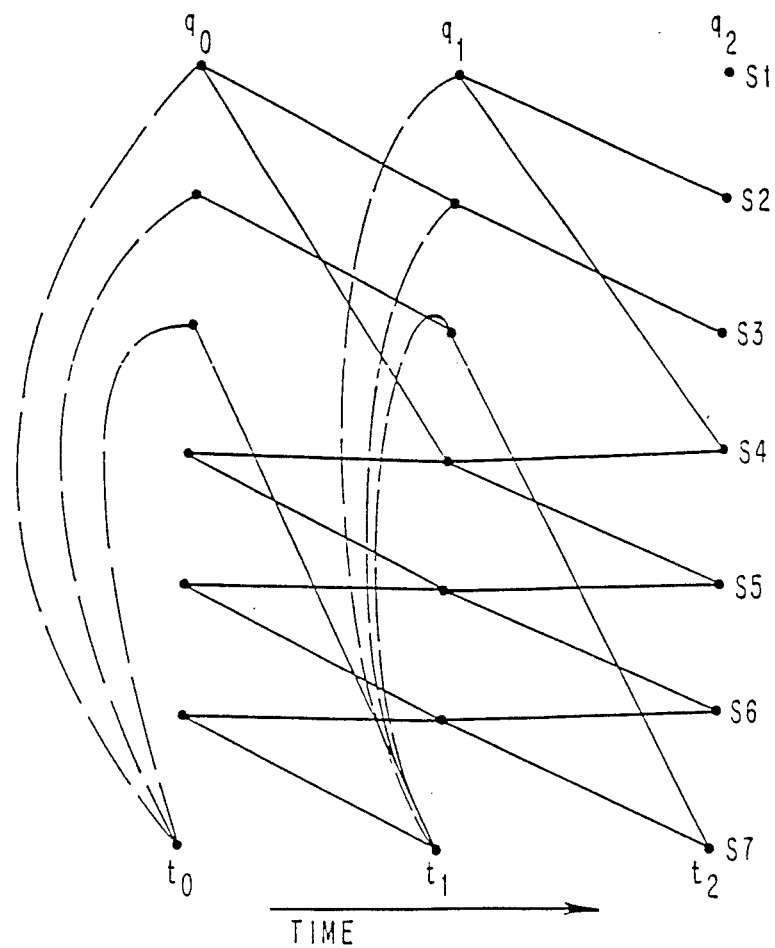
FIG. 20 is a trellis diagram, or lattice, of a detailed match procedure.

FIG. 20 is a trellis diagram of the phone machine of FIG. 9. As in the phone machine, the trellis diagram shows a null transition from state $S_1$ to state $S_7$ and transitions from state $S_1$ to state $S_2$ and from state $S_1$ to state $S_4$. The transitions between other states are also illustrated. The trellis diagram also shows time measured in the horizontal direction. Start-time probabilities $q_0$ and $q_1$ represent the probabilities that a phone has a start time at time $t=t_0$ or $t=t_1$, respectively, for the phone. At each start time $t_0$ and $t_1$, the various transitions are shown. It should be noted, in this regard, that the interval between successive start (and end) times is preferably equal in length to the time interval of a label.

In employing the detailed match phone machine 1200 to determine how closely a given phone matches the labels of an incoming string, an end-time distribution for the phone is sought and used in determining a match value for the phone. The notion of relying on the end-time distribution to perform a detailed match is common to all embodiments of phone machines discussed herein relative to a matching procedure. In generating the end-time distribution to perform a detailed match, the detailed match phone machine 2000 involves computations which are exact and complicated.

Looking at the trellis diagram of FIG. 20, we first consider the computations required to have both a start time and end time at time $t=t_0$. For this to be the case according to the example phone machine structure set forth in FIG. 9, the following probability applies:

$$Pr(S_7, t = t_0) = q_0 \times T(1 \to 7) + Pr(S_2, t = t_0) \times \qquad (21)$$
$$T(2 \to 7) + Pr(S_3, t = t_0) \times T(3 \to 7)$$

where Pr represents "probability of" and T represents the transition probability between the two parenthetically identified states. The above equation indicates that the respective probabilities for the three conditions under which the end time can occur at time $t=t_0$ are limited in the current example to an end time occurrence at state $S_7$.

Looking next at the end time $t=t_1$, it is noted that a calculation relating to every state other than state $S_1$ must be made. The state $S_1$ starts at the end time of the previous phone. For purposes of explanation, only the calculations pertaining to state $S_4$ are set forth.

For state $S_4$, the calculation is:

$$Pr(S_4, t = t_1) = Pr(S_1, t = t_0) \times T(1 \to 4) \times \qquad (22)$$
$$Pr(y_1 1 \to 4) + Pr(S_4, t = t_0) \times T(4 \to 4) \times Pr(y_1 4 \to 4)$$

In words, the equation (22) set forth immediately above indicates that the probability of the phone machine being in state $S_4$ at time $t=t_1$ is dependent on the sum of the following two terms (a) the probability of being at state $S_1$ at time $t=t_0$ multiplied by the probability (T) of the transition from state $S_1$ to state $S_4$ multiplied further by the probability (Pr) of a given label $y_1$ in the string being generated given a transition from state $S_1$ and $S_4$ and (b) the probability of being at state $S_4$ at time $t=t_0$ multiplied by the probability of the transition from state $S_4$ to itself and further multiplied by the probability of generating the given label $y_1$ during and given the transition from state $S_4$ to itself.

Similarly, calculations pertaining to the other states (excluding state $S_1$) are also performed to generate corresponding probabilities that the phone is at a particular state at time $t=t_1$. Generally, in determining the probability of being at a subject state at a given time, the detailed match (a) recognizes each previous state that has a transition which leads to the subject state and the respective probability of each such previous state; (b) recognizes, for each such previous state, a value representing the probability of the label that must be generated at the transition between each such previous state and the current state in order to conform to the label string; and (c) combines the probability of each previous state and the respective value representing the label probability to provide a subject state probability over a corresponding transition. The overall probability of being at the subject state is determined from the subject state probabilities over all transitions leading thereto. The calculation of or state $S_7$, it is noted, includes terms relating to the three null transitions which permit the phone to start and end at time $t=t_1$ with the phone ending in state $S_7$.

As with the probability determinations relative to time $t=t_0$ and $t=t_1$, probability determinations for a series of other end times are preferably generated to form an end-time distribution. The value of the end-time distribution for a given phone provides an indication of how well the given phone matches the incoming labels.

In determining how well a word matches a string of incoming labels, the phones which represent the word are processed in sequence. Each phone generates an end-time distribution of probability values. A match value for the phone is obtained by summing up the end-time probabilities and then taking the logarithm of that sum. A start-time distribution for the next phone is derived by normalizing the end-time distribution by, for example, scaling each value thereof by dividing each value by the sum so that the sum of scaled values totals one.

It should be realized that there are at least two methods of determining h, the number of phones to be examined for a given word or word string. In a depth first method, computation is made along a baseform—computing a running subtotal with each successive phone. When the subtotal is found to be below a predefined threshold for a given phone position therealong, the computation terminates. Alternatively, in a breadth first method, a computation for similar phone positions in each word is made. The computations following the first phone in each word, the second phone in each word, and so on are made. In the breadth first method, the computations along the same number of phones for the various words are compared at the same relative phone positions therealong. In either method, the word(s) having the largest sum of match values is the sought object.

The detailed match has been implemented in APAL (Array Processor Assembly Language) which is the native assembler for the Floating Point Systems, Inc. 190L. In this regard, it should be recognized that the detailed match requires considerable memory for storing each of the actual label probabilities (i.e., the probability that a given phone generates a given label y at a given transition); the transition probabilities for each phone machine; and the probabilities of a given phone being at a given state at a given time after a defined start time. The above-noted FPS 190L is set up to make the various computations of end times, match values based on, preferably, the logarithmic sum of end time probabilities; start times based on the previously generated end time probabilities; and word match scores based on the match values for sequential phones in a word. In addition, the detailed match preferably accounts for "tail probabilities" in the matching procedure. A tail probability measures the likelihood of successive labels without regard to words. In a simple embodiment, a given tail probability corresponds to the likelihood of a label following another label. This likelihood is readily determined from strings of labels generated by, for example, some sample speech.

Hence, the detailed match provides sufficient storage to contain baseforms, statistics for the Markov models, and tail probabilities. For a 5000 word vocabulary where each word comprises approximately ten phones, the baseforms have a memory requirement of $5000 \times 10$. Where there are 70 distinct phones (with a Markov model for each phone) and 200 distinct labels and ten transitions at which any label has a probability of being produced, the statistics would require $70 \times 10 \times 200$ locations. However, it is preferred that the phone machines are divided into three portions—start portion, a middle portion, and an end portion—with statistics corresponding thereto (one of the three self-loops is preferably included in each portion.) Accordingly, the storage requirements are reduced to $60 \times 2 \times 200$. With regard to the tail probabilities, $200 \times 200$ storage locations are needed. In this arrangement, 50 K integer and 82 K floating point storage performs satisfactorily.

Basic Fast Match

Because the detailed match is computationally expensive, a basic fast match and an alternative fast match which reduces the computation requirements without significantly sacrificing accuracy is provided. The fast match is preferably used in conjunction with the detailed match, the fast match listing likely candidate words from the vocabulary and the detailed match being performed on, at most, the candidate words on the list.

A fast approximate acoustic matching technique is the subject of the co-pending patent application entitled "Apparatus and Method of Performing Acoustic Matching". In the fast approximate acoustic match, preferably each phone machine is simplified by replacing the actual label probability for each label at all transitions in a given phone machine with a specific replacement value. The specific replacement value is preferably selected so that the match value for a given phone when the replacement values are used is an overestimation of the match value achieved by the detailed match when the replacement values do not replace the actual label probabilities. One way of assuring this condition is by selecting each replacement value so that no probability corresponding to a given label in a given phone machine is greater than the replacement value thereof. By substituting the actual label probabilities in a phone machine with corresponding replacement values, the number of required computations in determining a match score for a word is reduced greatly. Moreover, since the replacement value is preferably an overestimation, the resulting match score is not less than would have previously been determined without the replacement.

In a specific embodiment of performing an acoustic match in a linguistic decoder with Markov models, each phone machine therein is characterized—by training—to have (a) a plurality of states and transition paths between states, (b) transitions $tr(S_j \rightarrow S_1)$ having probabilities $T(i \rightarrow j)$ each of which represents the probability of a transition to a state $S_j$ given a current state $S_i$ where $S_i$ and $S_j$ may be the same state or different states, and (c) actual label probabilities wherein each actual label probability $p(y_k | i \rightarrow j)$ at each transition from one state to a subsequent state where k is a label identifying notation; each phone machine including (a) means for assigning to each $y_k$ in said each phone machine a single specific value $p'(y_k)$ and (b) means for replacing each actual output probability $p(y_k | i \rightarrow j)$ at each transition in a given phone machine by the single specific value $p'(y_k)$ assigned to the corresponding $y_k$. Preferably, the replacement value is at least as great as the maximum actual label probability for the corresponding $y_k$ label at any transition in a particular phone machine. The fast match embodiments are employed to define a list of on the order of ten to one hundred candidate words selected as the most likely words in the vocabulary to correspond to the incoming labels. The candidate words are preferably subjected to the language model and to the detailed match. By paring the number of words considered by the detailed match to on the order of 1% of the words in the vocabulary, the computational cost is greatly reduced while accuracy is maintained.

The basic fast match simplifies the detailed match by replacing with a single value the actual label probabilities for a given label at all transitions at which the given label may be generated in a given phone machine. That is, regardless of the transition in a given phone machine whereat a label has a probability of occurring, the probability is replaced by a single specific value. The value is preferably an overestimate, being at least as great as the largest probability of the label occurring at any transition in the given phone machine.

By setting the label probability replacement value as the maximum of the actual label probabilities for the given label in the given phone machine, it is assured that the match value generated with the basic fast match is at least as high as the match value that would result from employing the detailed match. In this way, the basic fast match typically overestimates the match value of each phone so that more words are generally selected as candidate words. Words considered candidates according to the detailed match also pass muster in accordance with the basic fast match.

Figure 21:
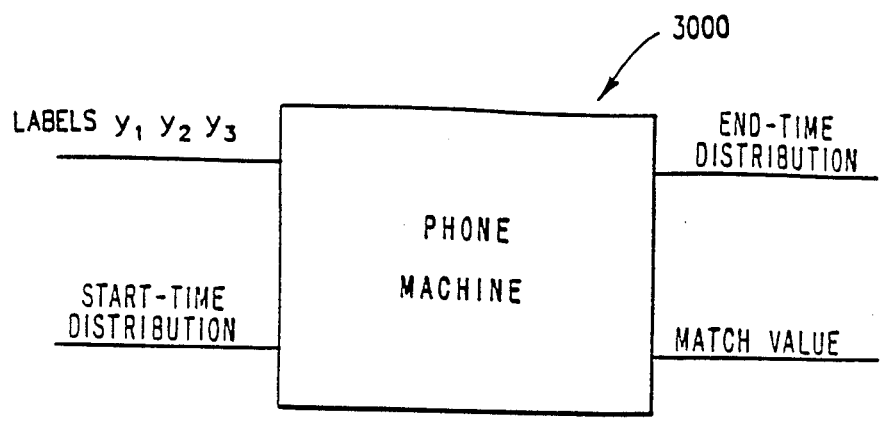
FIG. 21 is a diagram depicting a phone machine used in performing matching.

Referring to FIG. 21, a phone machine 3000 for the basic fast match is illustrated. Labels (also referred to as symbols and fenemes) enter the basic fast match phone machine 3000 together with a start-time distribution. The start-time distribution and the label string input are like those entering the detailed match phone machine described hereinabove. It should be realized that the start time may, on occasion, not be a distribution over a plurality of times but may, instead, represent a precise time—for example, following an interval of silence—at which the phone begins. When speech is continuous, however, the end-time distribution is used to define the start-time distribution (as is discussed in greater detail hereinbelow). The phone machine 3000 generates an end-time distribution and a match value for the particular phone from the generated end-time distribution. The match score for a word is defined as the sum of match values for component phones—at least the first h phones in the word.

Figure 22:
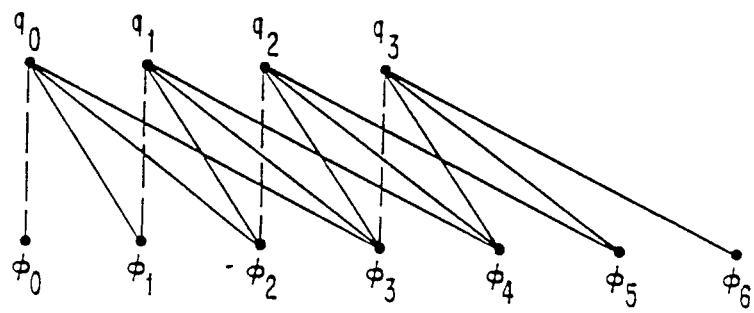
FIG. 22 is a time distribution diagram used in a matching procedure having certain imposed conditions.
Figure 24A:
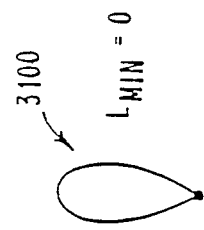
FIG. 24 (a) is a diagram showing a particular phone machine of minimum length zero and, FIG. 24 (b) is a time diagram corresponding thereto.
Figure 24B:
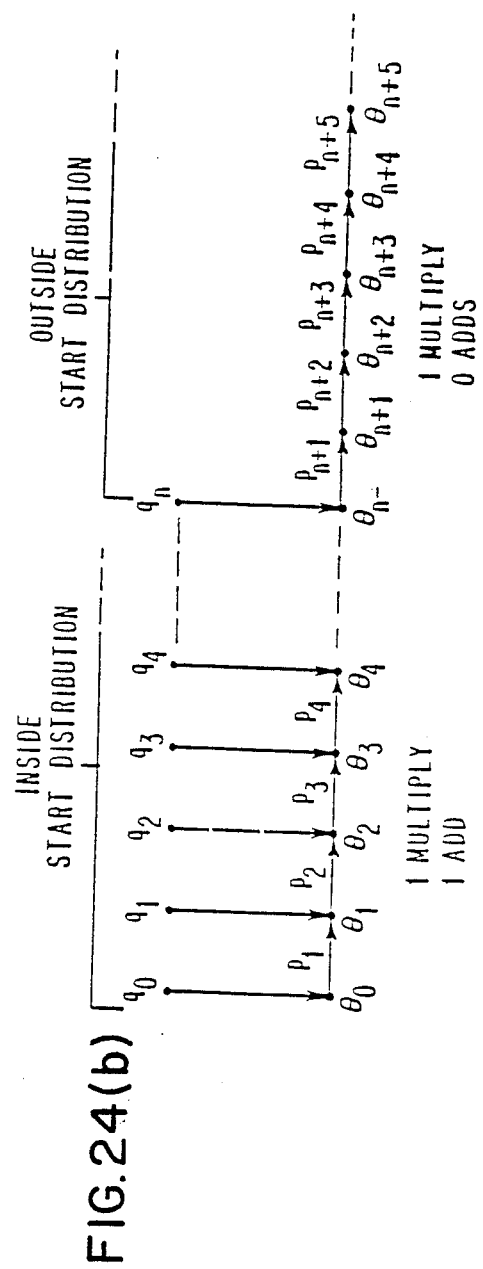

Referring now to FIG. 22, a diagram of a basic fast match computation is illustrated. The basic fast match computation is only concerned with the start-time distribution, the number—or length of labels—produced by the phone, and the replacement values $p'y_k$ associated with each label $y_k$.

By substituting all actual label probabilities for a given label in a given phone machine by a corresponding replacement value, the basic fast match replaces transition probabilities with length distribution probabilities and obviates the need for including actual label probabilities (which can differ for each transition in a given phone machine) and probabilities of being at a given state at a given time.

In this regard, the length distributions are determined from the detailed match model. Specifically, for each length in the length distribution, the matching procedure preferably examines each state individually and determines for each state the various transition paths by which the currently examined state can occur (a) given a particular label length and (b) regardless of the outputs along the transitions. The probabilities for all transition paths of the particular length to each subject state are summed and the sums for all the subject states are then added to indicate the probability of a given length in the distribution. The above procedure is repeated for each length. In accordance with the preferred form of the invention, these computations are made with reference to a trellis diagram as is known in the art of Markov modelling. For transition paths which share branches along the trellis structure, the computation for each common branch need be made only once and is applied to each path that includes the common branch.

In the diagram of FIG. 22, two limitations are included by way of example. First, it is assumed that the length of labels produced by the phone can be zero, one, two, or three having respective probabilities $l_0$, $l_1$, $l_2$, and $l_3$. The start time is also limited, permitting only four start times having respective probabilities of $q_0$, $q_1$, $q_2$, and $q_3$. With these limitations, the following equations define the end-time distribution of a subject phone as:

$$\phi_0 = q_0 l_0$$

$$\phi_1 = q_1 l_0 + q_0 l_1 p_1$$

$$\phi_2 = q_2 l_0 + q_1 l_1 p_2 q_0 l_2 p_1 p_2$$

$$\phi_3 = q_3 l_0 + q_2 l_1 p_3 + q_1 l_2 p_2 p_3 + q_0 l_3 p_1 p_{p3}$$

$$\phi_4 = q_3 l_1 p_4 + q_2 l_2 p_3 p_4 + q_1 l_3 p_2 p_3 p_4$$

$$\phi_5 = q_3 l_2 p_4 p_5 + q_2 l_3 p_3 p_4 p_5$$

$$\phi_6 = q_3 l_3 p_4 p_5 p_6$$

In examining the equations, it is observed that $\phi_3$ includes a term corresponding to each of four start times. The first term represents the probability that the phone starts at time $t = t_3$ and produces a length of zero labels—the phone starting and ending at the same time. The second term represents the probability that the phone starts at time $t = t_2$, that the length of labels is one, and that a label 3 is produced by the phone. The third term represents the probability that the phone starts at time $t = t_1$, and the length of labels is two (namely labels 2 and 3), and that labels 2 and 3 are produced by the phone. Similarly, the fourth term represents the probability that the phone starts at time $t = t_0$; that the length of labels is three; and that the three labels 1, 2, and 3 are produced by the phone.

Comparing the computations required in the basic fast match with those required by the detailed match suggest the relative simplicity of the former relative to the latter. In this regard, it is noted that the $p'_y$ value remains the same for each appearance in all the equations as do the label length probabilities. Moreover, with the length and start time limitations, the computations for the later end times become simpler. For example, at $\phi_6$, the phone must start at time $t = t_3$ and all three labels 4, 5, and 6 must be produced by the phone for that end time to apply.

In generating a match value for a subject phone, the end-time probabilities along the defined end-time distribution are summed. The log of the sum is then taken to provide a match value:

$$\text{match value} = \log_{10}(\phi_0 + \cdots + \phi_6)$$

As noted previously, a match score for a word is readily determined by summing the match values for successive phones in a particular word.

In describing the generating of the start time distribution, reference is made to FIG. 23. In FIG. 23 (a), the word THE$_1$ is repeated, broken down into its component phones. In FIG. 23 (b), the string of labels is depicted over time. In FIG. 23 (c), a first start-time distribution is shown. The first start-time distribution has been derived from the end-time distribution of the most recent previous phone (in the previous word which may include a "word" of silence). Based on the label inputs and the start-time distribution of FIG. 23 (c), the end-time distribution for the phone DH, $\phi_{DH}$, is generated. The start-time distribution for the next phone, UH1, is determined by recognizing the time during which the previous phone end-time distribution exceeded a threshold (A) in FIG. 23 (d). (A) is determined individually for each end-time distribution. Preferably (A) is a function of the sum of the end-time distribution values for a subject phone. The interval between times a and b thus represents the time during which the start-time distribution for the phone UH1 is set. (See FIG. 23 (e).) The interval between times c and d in FIG. 23 (e) corresponds to the times between which the end-time distribution for the phone DH exceeds the threshold (A) and between which the start-time distribution of the next phone is set. The values of the start-time distribution are obtained by normalizing the end-time distribution by, for example, dividing each end-time value by the end-time values which exceed the threshold (A).

The basic fast match phone machine 3000 has been implemented in a Floating Point Systems Inc. 190L with an APAL program. Other hardware and software may also be used to develop a specific form of the invention by following the teachings set forth herein.

Alternative Fast Match

The basic fast match employed alone or, preferably, in conjunction with the detailed match and/or a language model greatly reduces computation requirements. To further reduce computational requirements, the present invention further simplifies the detailed match by defining a uniform label length distribution between two lengths—a minimum length $L_{min}$ and a maximum length $L_{max}$. In the basic fast match, the probabilities of a phone generating labels of a given length—namely $l_0, l_1, l_2$, etc.—typically have differing values. According to the alternative fast match, the probability for each length of labels is replaced by a single uniform value.

Preferably, the minimum length is equal to the smallest length having a nonzero probability in the original length distribution, although other lengths may be selected if desired. The selection of the maximum length is more arbitrary than the selection of the minimum length, but is significant in that the probability of lengths less than the minimum and greater than the maximum are set as zero. By defining the length probability to exist between only the minimum length and the maximum length, a uniform pseudo-distribution can be set forth. In one approach, the uniform probability can be set as the average probability over the pseudo-distribution. Alternatively, the uniform probability value can be set as the maximum of the length probabilities that are replaced by the uniform value.

The effect of characterizing all the label length probabilities as equal is readily observed with reference to the equations set forth above for the end-time distribution in the basic fast match. Specifically, the length probabilities can be factored out as a constant.

With $L_{min}$ being set at zero and all length probabilities being replaced by a single constant value, the end-time distribution can be characterized as:

$$\phi_m = m/l = q_m + \phi_{m-1} p_m \tag{23}$$

where "1" is the single uniform replacement value and where the value for $p_m$ corresponds preferably to the replacement value for a given label being generated in the given phone at time m.

For the above equation for $\phi_m$, the match value is defined as:

$$\text{match value} = \log_{10}(\phi_0 + \phi_1 + \cdots + \phi_m) \tag{24}$$

$$+ \log_{10}(l)$$

In comparing the basic fast match and the alternative fast match, it has been found that the number of required additions and multiplications are greatly reduced by employing the alternative fast match phone machines. With $L_{min} = 0$, it has been found that the basic fast match required forty multiplications and twenty additions in that the length probabilities must be considered. With the alternative fast match, $\phi_m$ is determined recursively and requires one multiplication and one addition for each successive $\phi_m$.

Figure 25A:
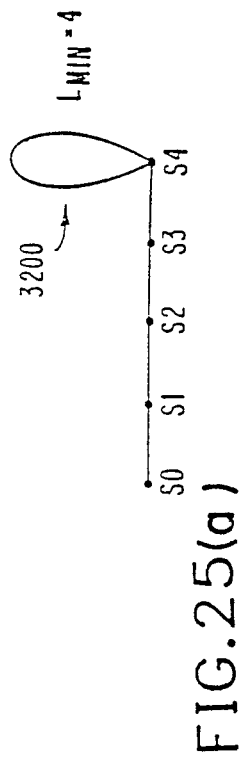
FIG. 25 (a) is a phone machine corresponding to a minimum length four and, FIG. 25 (b), is a time diagram corresponding thereto.
Figure 25B:
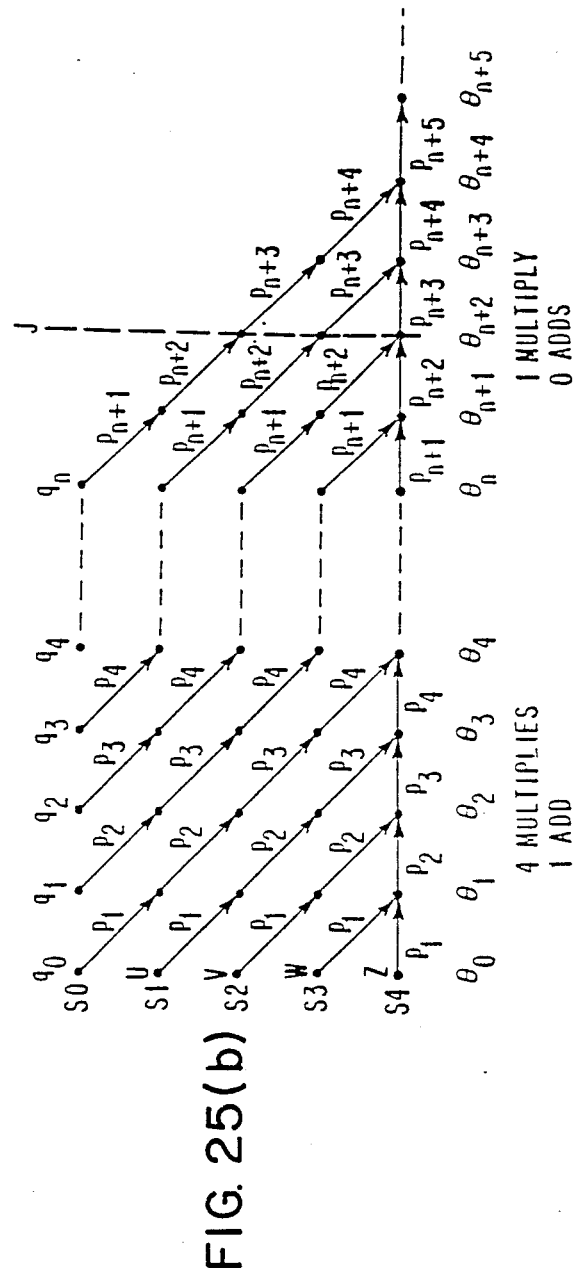

To further illustrate how the alternative fast match simplifies computations, FIGS. 24(A), 24(B), 25(A) and 25(B) are provided. In FIG. 24 (a), a phone machine embodiment 3100 corresponding to a minimum length $L_{min} = 0$ is depicted. The maximum length is assumed to be infinite so that the length distribution may be characterized as uniform. In FIG. 24 (b), the trellis diagram resulting from the phone machine 3100 is shown. Assuming that start times after $q_n$ are outside the start-time distribution, all determinations of each successive $\phi_m$ with m < n require one addition and one multiplication. For determinations of end times thereafter, there is only one required multiplication and no additions. In FIGS. 25(A) and 25(B), =4. FIG. 25 (a) illustrates a specific embodiment of a phone machine 3200 therefor and FIG. 25 (b) shows a corresponding trellis diagram. Because $L_{min} = 4$, the trellis diagram of FIG. 25 (b) has a zero probability along the paths marked U, V, W, and Z. For those end times which extend between $\phi_4$ and $\phi_n$, it is noted that four multiplications and one addition is required. For end times greater than n+4, one multiplication and no additions are required. This embodiment has been implemented in APAL code on a FPS 190L.

It should be noted that additional states may be added to the FIGS. 24(A) and 24(B) or FIGS. 25(A) and 25(B) embodiments as desired in accordance with the invention. For example, any number of states with null transitions may be included without altering the value of $L_{min}$.

Matching Based on First J Labels

As a further refinement to the basic fast match and alternative fast match, the present invention contemplates that only the first J labels of a string which enters a phone machine be considered in the match. Assuming that labels are produced by the acoustic processor of an acoustic channel at the rate of one per centisecond, a reasonable value of J is one hundred. In other words, labels corresponding to on the order of one second of speech will be provided to determine a match between a phone and the labels entering the phone machine. By limiting the number of labels examined, two advantages are realized. First, decoding delay is reduced and, second, problems in comparing the scores of short words with long words are substantially avoided. The length of J can, of course, be varied as desired.

The effect of limiting the number of labels examined can be noted with reference to the trellis diagram of FIG. 25 (b). Without the present refinement, the fast match score is the sum of the probabilities of $\phi_m$'s along the bottom row of the diagram. That is, the probability of being at state $S_4$ at each time starting at $t=t_0$ (for $L_{min}=0$) or $t=t_4$ (for $L_{min}=4$) is determined as $a_m$ and all $\phi_m$'s are then totalled. For $L_{min}=4$, there is no probability of being in state $S_4$ at any time before $t_4$. With the refinement, the summing of $\phi_m$'s terminates at time J. In FIG. 25 (b), time J corresponds to time $t_{n+2}$.

Terminating the examination of J labels over J time intervals can result in the following two probability summations in determining a match score. First, as described hereinbefore, there is a row calculation along the bottom row of the trellis diagram but only up to the time $J-1$. The probabilities of being in state $S_4$ at each time up to time $J-1$ are summed to form a row score. Second, there is a column score which corresponds to the sum of probabilities that the phone is at each respective state $S_0$ through $S_4$ at time J. That is, the column score is:

$$\text{column score} = \sum_{f=0}^{4} Pr(S_f, J) \tag{25}$$

The match score for a phone is obtained by summing the row score and column score and then taking the logarithm of that sum. To continue the fast match for the next phone, the values along the bottom row—preferably including time J—are used to derive the next phone start-time distribution.

After determining a match score for each of b consecutive phones, the total for all phones is, as before noted, the sum of the match scores for all the phones.

In examining the manner in which the end-time probabilities are generated in the basic fast match and alternative fast match embodiments set forth above, it is noted that the determination of column scores does not conform readily to the fast match computations. To better adapt the refinement of limiting the number of labels examined to the fast match and alternative match, the present invention provides that the column score be replaced by an additional row score. That is, an additional row score is determined for the phone being at state $S_4$ (in FIG. 25 (b)) between times J and $J+K$ where K is the maximum number of states in any phone machine. Hence, if any phone machine has ten states, the present refinement adds ten end times along the bottom row of the trellis for each of which a probability is determined. All the probabilities along the bottom row up to and including the probability at time $J+K$ are added to produce a match score for the given phone. As before, consecutive phone match values are summed to provide a word match score.

This embodiment has been implemented in APAL code on a FPS 190L; however as with other portions of the invention may be implemented with other codes on other hardware.

Phone Tree Structure and Fast Match Embodiments

By employing the basic fast match or alternative fast match—with or without the maximum label limitation—the computational time required in determining phone match values is reduced. In addition, the computational savings remain high even when the detailed match is performed on the words in the fast match derived list.

Figure 26:
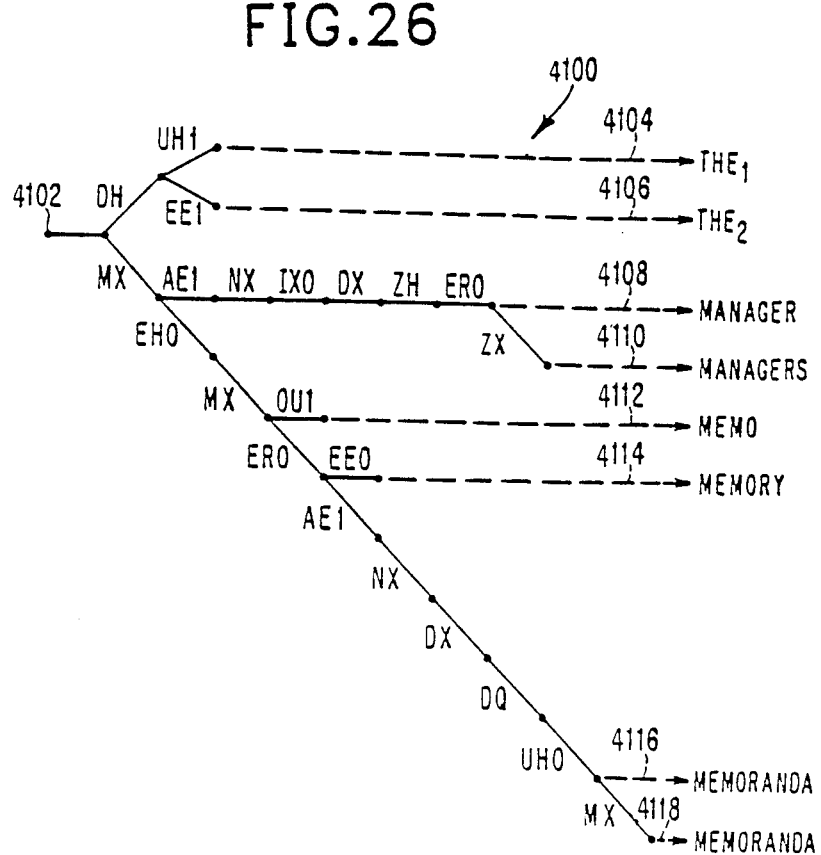
FIG. 26 is a diagram illustrating a tree structure of phones which permit processing of multiple words simultaneously.

The phone match values, once determined, are compared along the branches of a tree structure 4100 as shown in FIG. 26 to determine which paths of phones are most probable. In FIG. 26, the phone match values for DH and UH1 (emanating from point 4102 to branch 4104) should sum to a much higher value for the spoken word "the" than the various sequences of phones branching from the phone MX. In this regard, it should be observed that the phone match value of the first MX phone is computed only once and then used for each baseform extending therefrom. (See branches 4104 and 4106.) In addition, when the total score calculated along a first sequence of branches is found to be much lower than a threshold value or much lower than the total score for other sequences of branches, all baseforms extending from the first sequence may be simultaneously eliminated as candidate words. For example, baseforms associated with branches 4108 through 4118 are simultaneously discarded when it is determined that MX is not a likely path. With the fast match embodiments and the tree structure, an ordered list of candidate words is generated with great computational savings.

With regard to storage requirements, it is noted that the tree structure of phones, the statistics for the phones, and tail probabilities are to be stored. With regard to the tree structure, there are 25000 arcs and four datawords characterizing each arc. The first dataword represents an index to successor arcs or phones. The second dataword indicates the number of successor phones along the branch. The third dataword indicates at which node in the tree the arc is located. And the fourth dataword indicates the current phone. Hence, for the tree structure, $25000 \times 4$ storage spaces are required. In the fast match, there are 100 distinct phones and 200 distinct fenemes. In that a feneme has a single probability of being produced anywhere in a phone, storage for $100 \times 200$ statistical probabilities is required. Finally, for the tail probabilities, $200 \times 200$ storage spaces are required. 100 K integer and 60 K floating point storage is sufficient for the fast match.

Language Model

As noted previously, a language model which stores information—such as tri-grams—relating to words in context may be included to enhance the probability of a correct word selection. Language models have been reported in the literature.

The language model 1010 (see FIG. 7), preferably, has a unique character. Specifically, a modified tri-gram method is used. In accordance with this method, a sample text is examined to determine the likelihood of each ordered triplet of words, ordered pair of words, and single word in the vocabulary. A list of the most likely triplets of words and a list of the most likely pairs of words are formed. Moreover, the likelihood of a triplet not being in the triplet list and the likelihood of a pair not being in the pair list are respectively determined.

In accordance with the language model, when a subject word follows two words, a determination is made as to whether the subject word and the two preceding words are on the triplet list. If so, the stored probability assigned to the triplet is indicated. If the subject word and its two predecessors are not on the triplet list, a determination is made as to whether the subject word and its adjacent predecessor are on the pair list. If so, the probability of the pair is multiplied by the probability of a triplet not being on the triplet list, the product then being assigned to the subject word. If the subject word and its predecessor(s) are not on the triplet list or pair list, the probability of the subject word alone is multiplied by the likelihood of a triplet not being on the triplet list and by the probability of a pair not being on the pair list. The product is then assigned to the subject word.

Figure 27:
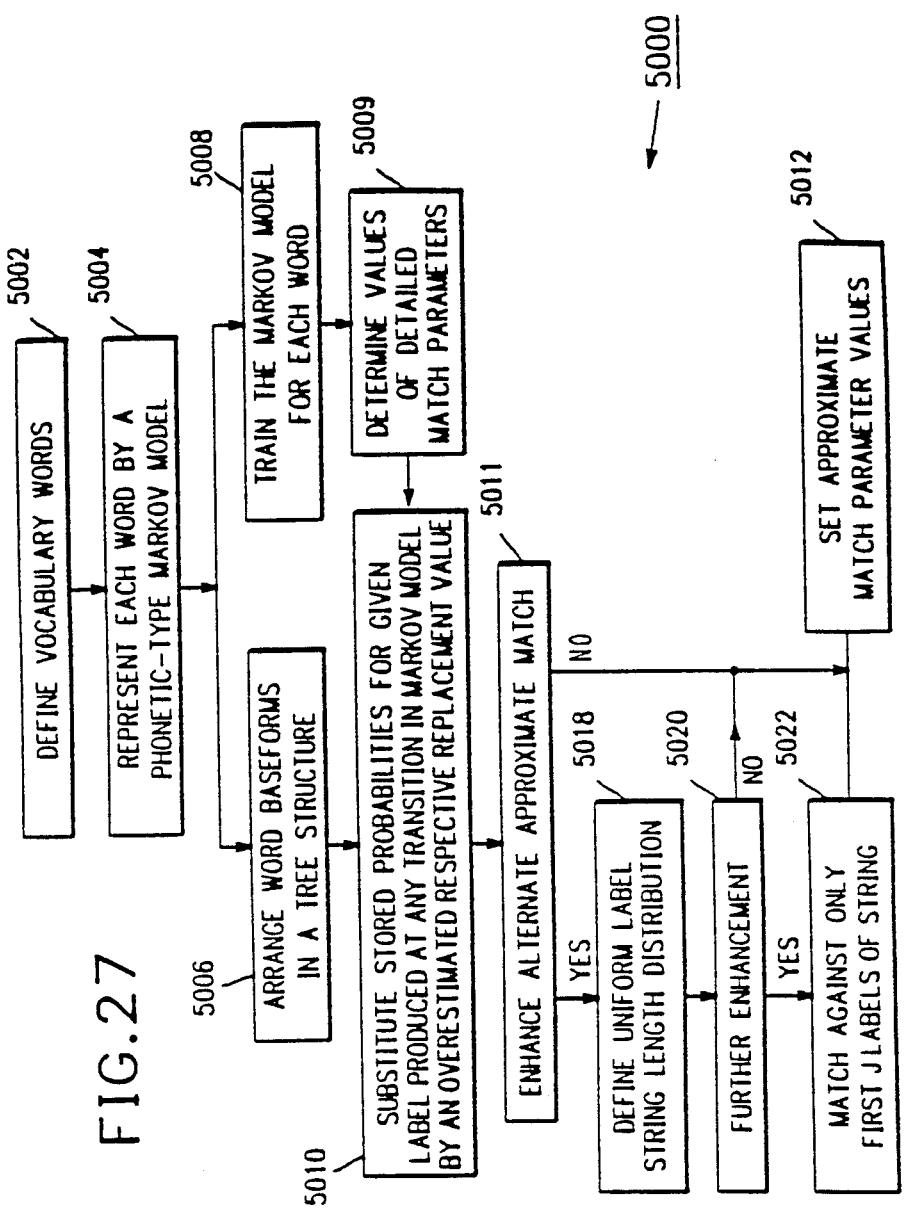
FIG. 27 is a flowchart illustrating the training of phone machines.

Training With Approximations Referring to FIG. 27, a flowchart 5000 illustrating the training of phone machines employed in acoustic matching is shown. At step 5002, a vocabulary of words—typically on the order of 5000 words—is defined. Each word is then represented by a sequence of phone machines. The phone machines have, by way of example, been shown as phonetic-type phone machines but may, alternatively, comprise a sequence of fenemic phones. Representing words by a sequence of phonetic-type phone machines or by a sequence of fenemic phone machines is discussed hereinbelow. A phone machine sequence for a word is referred to as a word baseform.

In step 5006, the word baseforms are arranged in the tree structure described hereinabove. The statistics for each phone machine in each word baseform are determined by training according to the well-known forward-backward algorithm set forth in the article "Continuous Speech Recognition by Statistical Methods" by F. Jelinek.

At step 5009, values to be substituted for actual parameter values or statistics used in the detailed match are determined. For example, the values to be substituted for the actual label output probabilities are determined. In step 5010, the determined values replace the stored actual probabilities so that the phones in each word baseform include the approximately substitute values. All approximations relating to the basic fast match are performed in step 5010.

A decision is then made as to whether the acoustic matching is to be further approximated or "enhanced" (step 5011). If not, the values determined for the basic approximate match are set for use and other approximations are not set for use (step 5012). If enhancement is desired, a uniform string length distribution is defined (step 5018). Another decision is made as to whether further enhancement is desired (step 5020). If not, label output probability values and string length probability values are approximated and set for use in the acoustic matching. If further enhancement is desired, acoustic matching is limited to the first J labels in the generates string (step 5022). Whether or not one of the enhanced embodiments is selected, the parameter values determined are set in step 5012. At this time, each phone machine in each word baseform has been trained with the desired approximations.

Extending Word Paths with Words Selected by Acoustic Matching

The preferred stack decoding methodology used in the speech recognition of FIG. 7 is now described.

In FIG. 10 and FIG. 11, a plurality of successive labels $y_0y_1$—are shown generated at successive "label intervals", or "label positions".

Also shown in FIG. 11 are a plurality of some generated word paths, namely path A, path B, and path C. In the context of FIG. 10, path A could correspond to the entry "to be or", path B to the entry "two b", and path C to the entry "too". For a subject word path, there is a label (or equivalently a label interval) at which the subject word path has the highest probability of having ended—such label being referred to as a "boundary label".

For a word path W representing a sequence of words, a most likely end time—represented in the label string as a "boundary label" between two words—can be found by known methods such as that described in an article entitled "Faster Acoustic Match Computation" (by L.R. Bahl, F. Jelinek, and R. L. Mercer) in the *IBM Technical Disclosure Bulletin*, volume 23, number 4, September 1980. Briefly, the article discusses methodology for addressing two similar concerns: (a) how much of a label string Y is accounted for by a word (or word sequence) and (b) at which label interval does a partial sentence—corresponding to a part of the label string—end.

For any given word path, there is a "likelihood value" associated with each label or label interval, including the first label of the label string through to the boundary label. Taken together, all of the likelihood values for a given word path represent a "likelihood vector" for the given word path. Accordingly, for each word path there is a corresponding likelihood vector. Likelihood values $L_t$ are illustrated in FIG. 11.

A "likelihood envelope" $\Lambda$ t at a label interval t for a collection of word paths $W^1, W^2, \ldots, W_S$ is defined mathematically as:

$$\Lambda t = \max(L_t(W^1), \ldots, L_t(W_s))$$

That is, for each label interval, the likelihood envelope includes the highest likelihood value associated with any word path in the collection. A likelihood envelope 1040 is illustrated in FIG. 11.

A word path is considered "complete" if it corresponds to a complete sentence. A complete path is preferably identified by a speaker entering an input, e.g. pressing a button, when he reaches the end of a sentence. The entered input is synchronized with a label interval to mark a sentence end. A complete word path cannot be extended by appending any words thereto. A "partial" word path corresponds to an incomplete sentence and can be extended.

Partial paths are classified as "live" or "dead". A word path is "dead" if it has already been extended and "live" if it has not. With this classification, a path which has already been extended to form one or more longer extended word paths is not reconsidered for extension at a subsequent time.

Each word path is also characterizable as "good" or "bad" relative to the likelihood envelope. The word path is good if, at the label corresponding to the boundary label thereof, the word path has a likelihood value which is within of the maximum likelihood envelope. Otherwise, the word path is marked as "bad". Preferably, but not necessarily, is a fixed value by which each value of the maximum likelihood envelope is reduced to service a good/bad threshold level.

For each label interval there is a stack element. Each live word path is assigned to the stack element corresponding to the label interval that corresponds to the boundary label of such a live path. A stack element may have zero, one, or more word path entries—the entries being listed in order of likelihood value.

The steps performed by the stack decoder 1002 of FIG. 7 are now discussed.

Forming the likelihood envelope and determining which word paths are "good" are interrelated as suggested by the sample flowchart of FIG. 12.

In the flowchart of FIG. 12, a null path is first entered into the first stack (0) in step 5050. A stack (complete) element is provided which contains complete paths, if any, which have been previously determined (step 5052). Each complete path in the stack (complete) element has a likelihood vector associated therewith. The likelihood vector for the complete path having the highest likelihood at the boundary label thereof initially defines the maximum likelihood envelope. If there is no complete path in the stack (complete) element, the maximum likelihood envelope is initialized at −oo at each label interval. Moreover, if complete paths are not specified, the maximum likelihood envelope may be initialized at −oo. Initializing the envelope is depicted by steps 5054 and 5046.

After the maximum likelihood envelope is initialized, it is reduced by a predefined amount to form a Δ-good region above the reduced likelihoods and a Δ-bad region below the reduced likelihoods. The value of controls the breadth of the search. The larger Δ is, the larger the number of word paths that are considered for possible extension. When $\log_{10}$ is used for determining $L_t$, a value of 2.0 for provides satisfactory results. The value of is preferably, but not necessarily, uniform along the length of label intervals.

As shown in FIG. 12, a loop for up-dating the likelihood envelope and for marking word paths as "good" (for possible extension) or "bad" starts with the finding of the longest unmarked word path (step 5058). If more than one unmarked word path is in the stack corresponding to the longest word path length, the word path having the highest likelihood at the boundary label thereof is selected. If a word path is found, it is marked s "good" if the likelihood at the boundary label thereof lies within the -good region or "bad" other (step 5060). If the word path is marked "bad", the next unmarked live path is searched for marked (step 5062). If the word path is marked "good", the likelihood envelope is updated to include the likelihood values of the path marked "good". That is, for each label interval, an updated likelihood value is determined as the greater likelihood value between (a) the present likelihood value in the likelihood envelope and (b) the likelihood value associated with word path marked "good". This is illustrated by steps 5064 and 5066. After the envelope is updated, a longest best unmarked live word path is again found (step 5058).

The loop is then repeated until no unmarked word paths remain. At that time, the shortest word path marked "good" is selected. If there is more than one "good" word path having a shortest length, the one having the highest likelihood at the boundary label thereof is selected (step 5070). The selected shortest path is then subjected to extension. That is, at least, one likely follower word is determined as indicated above by preferably performing the fast match, language model, detailed match, and language model procedure. For each likely follower word, an extended word path is formed. Specifically, an extended word path is formed by appending a likely follower word on the end of the selected shortest word path.

After the selected shortest word path is formed into extended word paths, the selected word path is removed from the stack in which it was an entry and each extended word path is entered into the appropriate stack therefor. In particular, an extended word path becomes an entry into the stack corresponding to the boundary label of the extended word path step 5072.

With regard to step 5072, the action of extending the chosen path is discussed with reference to the flowchart of FIG. 12. After the path is found in step 5070, the following procedure is performed whereby a word path or paths are extended based on an appropriate approximate match. The procedure is outlined in FIG. 28.

Figure 28:
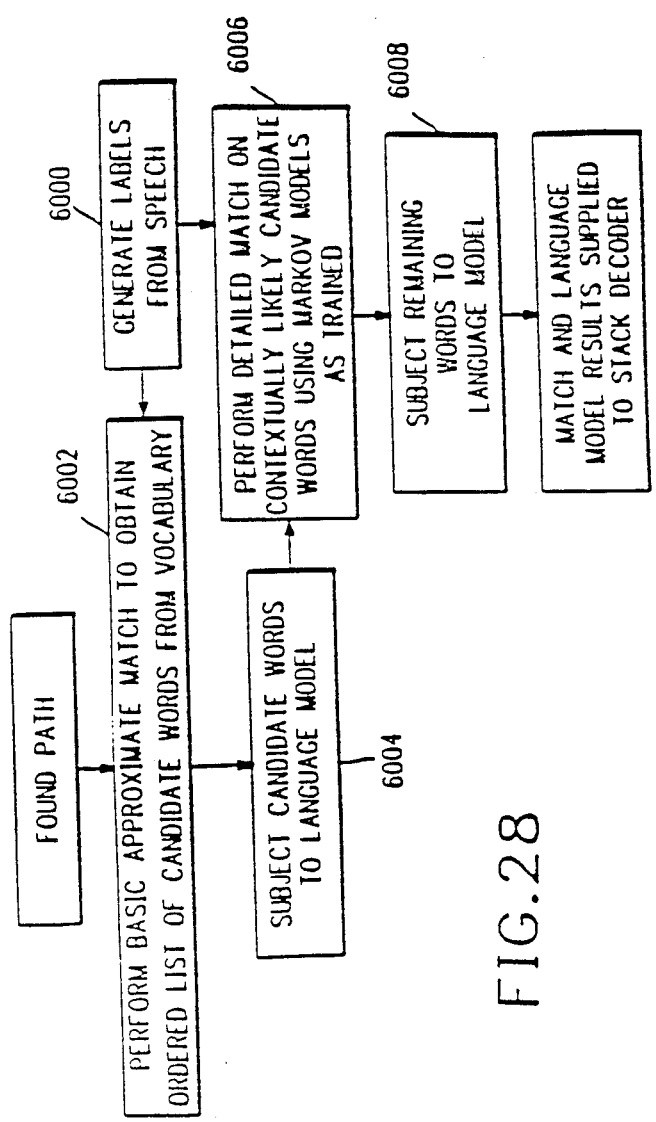
FIG. 28 is a flowchart illustrating how word paths are extended in the stack decoding procedure.

In accordance with FIG. 28, at step 6000, the acoustic processor 1002 (of FIG. 7) generates a string of labels. The string of labels is provided as input to enable step 6002 to be performed. In step 6002 the basic or one of the enhanced approximate matching procedures is performed to obtain an ordered list of candidate words. Thereafter, a language model (as described hereinabove) is applied in step 6004 as described hereinabove. The subject words remaining after the language model is applied are entered together with the generated labels in a detailed match processor which performs step 6006. The detailed match results in a list of remaining candidate words which are preferably subjected to the language model in step 6008. The likely words—as determined by the approximate match, detailed match, and language model—are used for extension of the path found in step 5070 of FIG. 12. Each of the likely words determined at step 6008 (FIG. 28) are separately appended to the found word path so that a plurality of extended word paths may be formed.

Referring again to FIG. 12, after the extended paths are formed and the stacks are reformed, the process repeats by returning to step 5052.

Each iteration thus consists of selecting the shortest best "good" word path and extending it. A word path marked "bad" on one iteration may become "good" on a later iteration. The characterization of a live word path as "good" or "bad" is thus made independently on each iteration. In practice, the likelihood envelope does not change greatly from one iteration to the next and the computation to decide whether a word path is "good" or "bad" is done efficiently. Moreover, normalization is not required.

When complete sentences are identified, step 5074 is preferably included. That is, when no live word paths remain unmarked and there are no "good" word paths to be extended, decoding is finished. The complete word path having the highest likelihood at the respective boundary label thereof is identified as the most likely word sequence for the input label string.

In the case of continuous speech where sentence endings are not identified, path extension proceeds continually or for a predefined number of words as preferred by the system user.

Effect of Invention

As suggested hereinbefore, the present invention enables each word in the vocabulary to be identified by a sequence of identifiers for CLINKS and the phone machines corresponding thereto. Each word baseform, that is, is stored for the detailed match and for the employed fast match as simply a sequence of identifiers rather than as a sequence of phone machines wherein each phone is filled with statistics. As noted hereinabove, the statistics for each phone machine are stored only once.

In addition to the variations and modifications to applicant s disclosed apparatus which have been suggested, many other variations and modifications will be apparent to those skilled in the art, and accordingly, the scope of applicant's invention is not to be construed to be limited to the particular embodiments shown or suggested.

APPENDIX 1

Procedure for generating BLINKS from HOOK pairs and for reducing BLINKS to CLINKS.

1. Determine nodes from right HOOK that are eligible for connection to the left HOOK.
2. Determine nodes in left HOOK that are connectable to eligible nodes in right HOOK.
3. Make connections and prune unused branches.
4. Determine confluent nodes of resulting graph (a BLINK graph) and break BLINK into sequence of CLINKS.

APPENDIX 2

Sample Portion of CLINK Inventory 1. t 2. flapped 't'
   • t •

3. φ • z     consonant cluster simplification
        s
      •   •
   K • s 4. affricate simplification
   φ •—•  J
     t  z •
   ? φ  •—• J
     • h 5. voicing assimilation
   f •—• s
       s •
   v •—• z

We claim:

1. An apparatus for storing electronic representation of words, said apparatus comprising:
   means for storing a first electronic signal representing at least two alternative pronunciations of a portion of speech, said first signal comprising data having a data length, said first signal being identified by a first identifier with a length less than the data length of the first signal;
   means for storing a second electronic signal representing a first word comprising the first portion of speech, said second signal comprising the first identifier for representing at least a portion of the first word; and
   means for storing a third electronic signal representing a second word different from the first word, said second word comprising the first portion of speech, said third signal comprising the first identifier for representing at least a portion of the second word.

2. An apparatus as claimed in claim 1, characterized in that the occurrence of any one of the alternative pronunciations of the first portion of speech is independent of the occurrence of other portions of speech preceding or following the first portions of speech.

3. An apparatus as claimed in claim 1, characterized in that the occurrence of any one of the alternative pronunciations of the first portion of speech is dependent on the occurrence of other portions of speech preceding the first portion of speech.

4. An apparatus as claimed in claim 1, characterized in that the occurrence of any one of the alternative pronunciations of the first portion of speech is dependent on the occurrence of other portions of speech following the first portion of speech.

5. An apparatus as claimed in claim 1, characterized in that the first electronic signal comprises probability data representing the probability of occurrence of each of the alternative pronunciations of the first portion of speech.

6. An apparatus for storing electronic representations of words, said apparatus comprising:
   means for storing a first electronic signal representing at least two alternative pronunciations of a first portion of speech, the occurrence of one of any one of said alternative pronunciations of the first portion of speech being independent of the occurrence of other portions of speech preceding or following the first portion of speech, said first signal comprising data having a data length, said first signal being identified by a first identifier with a length less than the data length of the first signal;
   means for storing a second electronic signal representing at least two alternative pronunciations of a second portion of speech different from the first portion of speech, the occurrence of any one of said alternative pronunciations of the second portion of speech being dependent on the occurrence of other portions of speech following the second portion of speech, the occurrence of any one of said alternative pronunciations of the second portion of speech being independent of the occurrence of other portions of speech preceding the second portion of speech, said second signal comprising data having a data length, said second signal being identified by a second identifier with a length less than the data length of the second signal;
   means for storing a third electronic signal representing at least two alternative pronunciations of a third portion of speech different from the first and second portions of speech, the occurrence of any one of said alternative pronunciations of the third portion of speech being dependent on the occurrence of other portions of speech preceding the third portion of speech, the occurrence of any of one of said alternative pronunciations of the third portion of speech being independent of the occurrence of other portions of speech following the third portion of speech, said third signal comprising data having a data length, said third signal being identified by a third identifier with a length less than the data length of the third signal;
   means for storing a fourth electronic signal representing a first word comprising the second portion of speech, said fourth signal comprising the second identifier for representing at least a portion of the first word;

means for storing a fifth electronic signal representing a second word different from the first word, said second word comprising the third portion of speech, said fifth signal comprising the third identifier for representing at least a portion of the second word; and means for storing a sixth electronic signal comprising the first identifier for representing the second portion of speech followed by the third portion of speech.

7. A method of storing electronic representations of words, said method comprising:

storing a first electronic signal representing at least two alternative pronunciations of a portion of speech, said first signal comprising data having a data length, said first signal being identified by a first identifier with a length less than the data length of the first signal;

storing a second electronic signal representing a first word comprising the first portion of speech, said second signal comprising the identifier for representing at least a portion of the first word; and storing a third electronic signal representing a second word different from the first word, said second word comprising the first portion of speech, said third signal comprising the first identifier for representing at least a portion of the second word.

8. A method as claimed in claim 7, characterized in that the occurrence of any one of the alternative pronunciations of the first portion of speech is independent of the occurrence of other portions of speech preceding or following the first portion of speech.

9. A method as claimed in claim 7, characterized in that the occurrence of any one of the alternative pronunciations of the first portion of speech is dependent on the occurrence of other portions of speech preceding the first portion of speech.

10. A method as claimed in claim 7, characterized in that the occurrence of any one of the alternative pronunciations of the first portion of speech is dependent on the occurrence of other portions of speech following the first portion of speech.

11. A method as claimed in claim 7, characterized in that the first electronic signal comprises probability data representing the probability of occurrence of each of the alternative pronunciations of the first portion of speech.

12. A method of storing electronic representations of words, said method comprising:

storing a first electronic signal representing at least two alternative pronunciations of a first portion of speech, the occurrence of any one of said alternative pronunciations of the first portion of speech being independent of the occurrence of other portions of speech preceding or following the first portion of speech, said first signal comprising data having a data length, said first signal being identified by a first identifier with a length less than the data length of the first signal;

storing a second electronic signal representing at least two alternative pronunciations of a second portion of speech different from the first portion of speech the occurrence of any one of said alternative pronunciations of the second portion of speech being dependent on the occurrence of other portions of speech following the second portion of speech, the occurrence of any one of said alternative pronunciations of the second portion of speech being independent of the occurrence of other portions of speech preceding the second portion of speech, said second signal comprising data having a data length, said second signal being identified by a second identifier with a length less than the data length of the second signal;

storing a third electronic signal representing at least two alternative pronunciations of a third portion of speech different from the first and second portions of speech, the occurrence of any one of said alternative pronunciations of the third portion of speech being dependent on the occurrence of other portions of speech preceding the third portion of speech, the occurrence of any one of said alternative pronunciations of the third portion of speech being independent of the occurrence of other portions of speech following the third portion of speech, said third signal comprising data having a data length, said third signal being identified by a third identifier with a length less than the data length of the third signal;

storing a fourth electronic signal representing a first word comprising the second portion of speech, said fourth signal comprising the second identifier for representing at least a portion of the first word;

storing a fifth electronic signal representing a second word different from the first word, said second word comprising the third portion of speech, said fifth signal comprising the third identifier for representing at least a portion of the second word; and storing a sixth electronic signal comprising the first identifier for representing the second portion of speech followed by the third portion of speech.

13. An apparatus for storing electronic representations of words, said apparatus comprising:

means for storing a speech unit signal, said speech unit signal comprising first data representing at least a first pronunciation of a first speech unit, said speech unit signal comprising second data representing at least a second pronunciation different from the first pronunciation of the first speech unit, said first and second data having a data length, said first signal being identified by a first identifier with a length less than the data length of the first signal;

means for storing a first word signal representing a first word comprising the first speech unit, said first word signal comprising the first identifier for representing at least a portion of the first word;

means for storing a second word signal representing a second word different from the first word, said second word comprising the first speech unit, said second word signal comprising the first identifier for representing at least a portion of the second word;

means for retrieving the first word signal and for retrieving the first identifier for representing at least a portion of the first word;

means for identifying the stored speech unit signal from the retrieved first identifier, and for retrieving the first data or the second data from the speech unit signal; and means for generating a phone machine for one pronunciation of the portion of the first word from the retrieved first data or second data, but not both.

14. An apparatus as claimed in claim 13, characterized in that the occurrence of either the first pronunciation or the second pronunciation of the first speech unit is independent of the occurrence of other speech units preceding or following the first speech unit.

15. An apparatus as claimed in claim 13, characterized in that the occurrence of either the first pronunciation or the second pronunciation of the first speech unit is dependant on the occurrence of other speech units preceding the first speech unit.

16. An apparatus as claimed in claim 13, characterized in that the occurrence of either the first pronunciation or the second pronunciation of the first speech unit is dependent on the occurrence of other speech units following the first speech unit.

17. An apparatus as claimed in claim 13, characterized in that the speech unit signal further comprises probability data representing the probability of occurrence of either the first pronunciation or the second pronunciation of the first speech unit.

18. A method of storing electronic representations of words, said method comprising the step of:
  storing a speech unit signal, said speech unit signal comprising first data representing at least a first pronunciation of a first speech unit, said speech unit signal comprising second data representing at least a second pronunciation different from the first pronunciation of the first speech unit, said first and second data having a data length, said first signal being identified by a first identifier with a length less than the data length of the first signal;
  storing a first word signal representing a first word comprising the first speech unit, said first word signal comprising the first identifier for representing at least a portion of the fist word;
  storing a second word signal representing a second word different from the first word, said second word comprising the first speech unit, said second word signal comprising the first identifier for representing at least a portion of the second word;
  retrieving the first word signal and retrieving the first identifier for representing at least a portion of the first word;
  identifying the stored speech unit signal from the retrieved first identifier, and retrieving the first data or the second data from the speech unit signal; and
  generating a phone machine for one pronunciation of the portion of the first word from the retrieved first data or second data, but not both.

19. A method as claimed in claim 18, characterized in that the occurrence of either the first pronunciation or the second pronunciation of the first speech unit is independent of the occurrence of other speech units preceding or following the first speech unit.

20. A method as claimed in claim 18, characterized in that the occurrence of either the first pronunciation or the second pronunciation of the first speech unit is dependent on the occurrence of other speech units preceding the first speech unit.

21. A method as claimed in claim 18, characterized in that the occurrence of either the first pronunciation or the second pronunciation of the first speech unit is dependent on the occurrence of other speech units following the first speech unit.

22. A method as claimed in claim 18, characterized in that the speech unit signal further comprises probability data representing the probability of occurrence of either the first pronunciation or the second pronunciation of the first speech unit.

23. A speech recognition apparatus comprising:
  means for storing a speech unit signal, said speech unit signal comprising first data representing at least a first pronunciation of a first speech unit, said speech unit signal comprising second data representing at least a second pronunciation different from the first pronunciation of the first speech unit, said first and second data having a data length, said first signal being identified by a first identifier with a length less than the data length of the first signal;
  means for storing a first word signal representing a first word comprising the first speech unit, said first word signal comprising the first identifier for representing at least a portion of the first word;
  means for storing a second word signal representing a second word different from the first word, said second word comprising the first speech unit, said second word signal comprising the first identifier for representing at least a portion of the second word;
  means for retrieving the first word signal and for retrieving the first identifier for representing at least a portion of the first word;
  means for identifying the stored speech unit signal from the retrieved first identifier, and for retrieving the first data or the second data from the speech unit signal;
  means for generating a phone machine for one pronunciation of the portion of the first word from the retrieved first data or second data, but not both;
  means for converting a spoken sound into an utterance signal; and
  means for matching the utterance signal to the phone machine and for outputting a match score signal proportional to the likelihood of the phone machine producing the utterance signal.

* * * * *